(12) United States Patent  (10) Patent No.: US 6,468,671 B1
Streuber  (45) Date of Patent: Oct. 22, 2002

(54) FOAMED METAL PREFORMED BODY

(76) Inventor: Fritz Michael Streuber, Bakusbrink 27, 32120 Hiddenhausen (DE)

( * ) Notice: Subject to any disclaimer, the term of this patent is extended or adjusted under 35 U.S.C. 154(b) by 0 days.

(21) Appl. No.: 09/448,257

(22) Filed: Nov. 24, 1999

(30) Foreign Application Priority Data

Nov. 24, 1998 (DE) .......................... 198 54 173

(51) Int. Cl.⁷ .............................. B32B 3/00; B22F 3/11; B22F 7/04; B22F 19/00
(52) U.S. Cl. ...................... 428/613; 428/313.3; 164/79; 164/108; 164/111
(58) Field of Search ................. 428/613, 586, 428/582, 598, 599, 595, 603, 320.2, 316.6, 313.3, 313.9; 164/108, 79, 111, 128

(56) References Cited

U.S. PATENT DOCUMENTS

| | | | | |
|---|---|---|---|---|
| 3,711,363 A | * | 1/1973 | Jarema et al. | 428/613 |
| 3,832,820 A | | 9/1974 | Eggert | 52/753 T |
| 3,834,881 A | * | 9/1974 | Niebylski | 428/613 |
| 3,848,666 A | * | 11/1974 | Valdo | 165/168 |
| 5,151,246 A | | 9/1992 | Baumeister et al. | 419/2 |
| 5,482,533 A | * | 1/1996 | Masuda et al. | 75/415 |
| 5,564,064 A | * | 10/1996 | Martin | 419/5 |
| 5,888,600 A | * | 3/1999 | Wycech | 428/35.9 |
| 6,135,542 A | * | 10/2000 | Emmelmann et al. | 296/205 |

FOREIGN PATENT DOCUMENTS

| | | |
|---|---|---|
| DE | 2 147 063 | 5/1972 |
| DE | 41 01 630 C2 | 12/1991 |
| DE | 43 18 540 A1 | 12/1994 |
| DE | 44 26 627 C2 | 2/1995 |
| DE | 44 16 371 A1 | 11/1995 |
| DE | 196 12 781 C1 | 8/1997 |
| DE | 197 17 894 A1 | 11/1997 |
| EP | 0 701 633 B1 | 3/1996 |
| EP | 0 744 586 | 11/1996 |
| EP | 0 844 167 A2 | 5/1998 |
| FR | 1155740 | 5/1958 |
| JP | 54-73349 | * 6/1979 |
| JP | 60-294 | * 1/1985 |
| JP | 63-271093 | * 11/1988 |
| JP | 10-058575 | 3/1998 |
| JP | 10-175567 | 6/1998 |
| WO | WO 97/11843 | * 4/1997 |

OTHER PUBLICATIONS

Sedliaková, N.; Simančik, F.; Kováčik; and Minár, P., "Joining of Aluminum Foams," *Metallschäume*, 1997, pp. 177–185, MIT Bremen, Germany, no month.

European Search Report of EP 99 12 3136 dated Oct. 19, 2000.

* cited by examiner

Primary Examiner—John J. Zimmerman
(74) Attorney, Agent, or Firm—Ratner & Prestia

(57) ABSTRACT

In a foamed metal preformed body, including foamed metal foam material, at least one flow conduit (18) for communicating a thermal treatment fluid is guided through or into the foamed metal foam material.

19 Claims, 13 Drawing Sheets

Figure 1A:
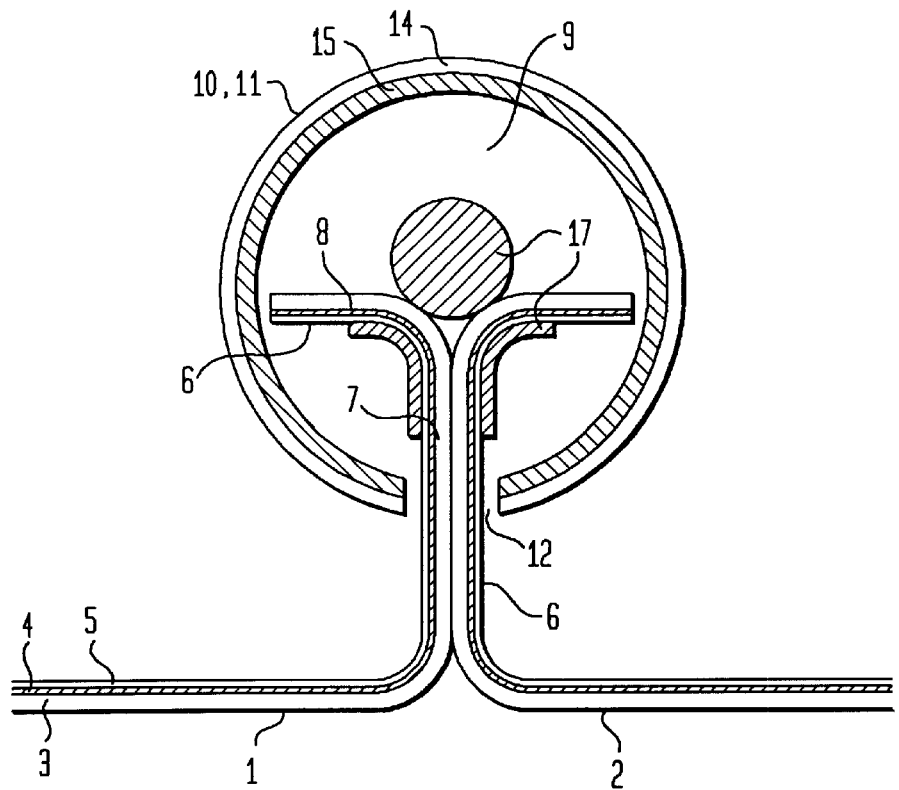

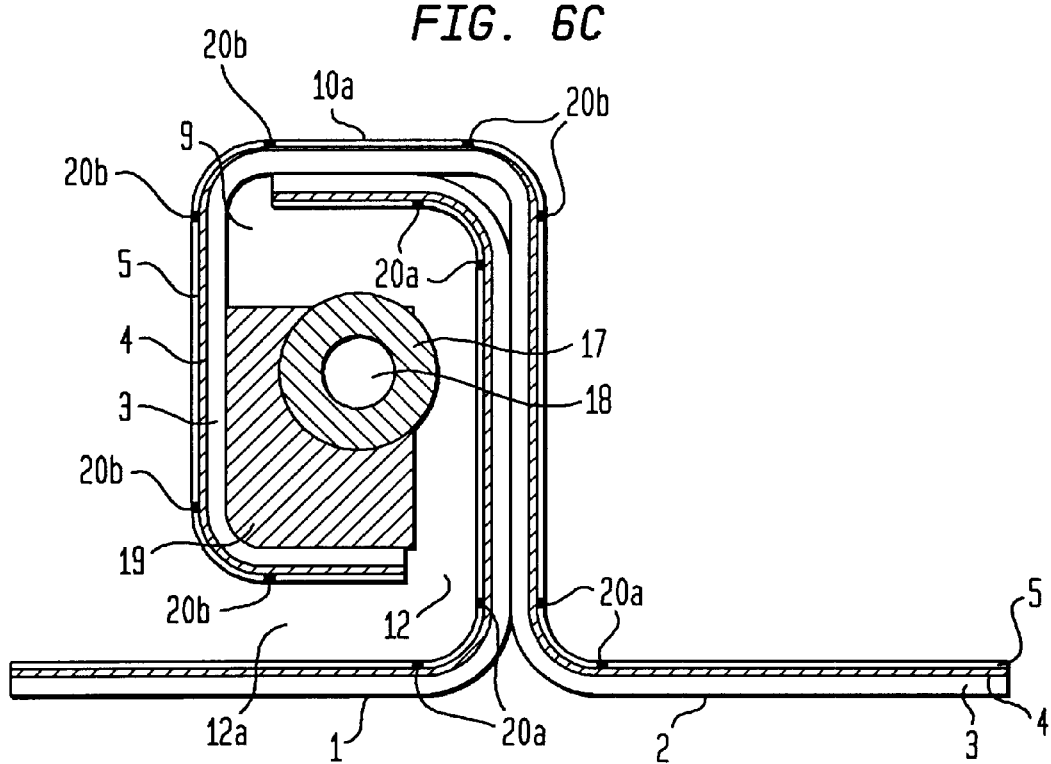
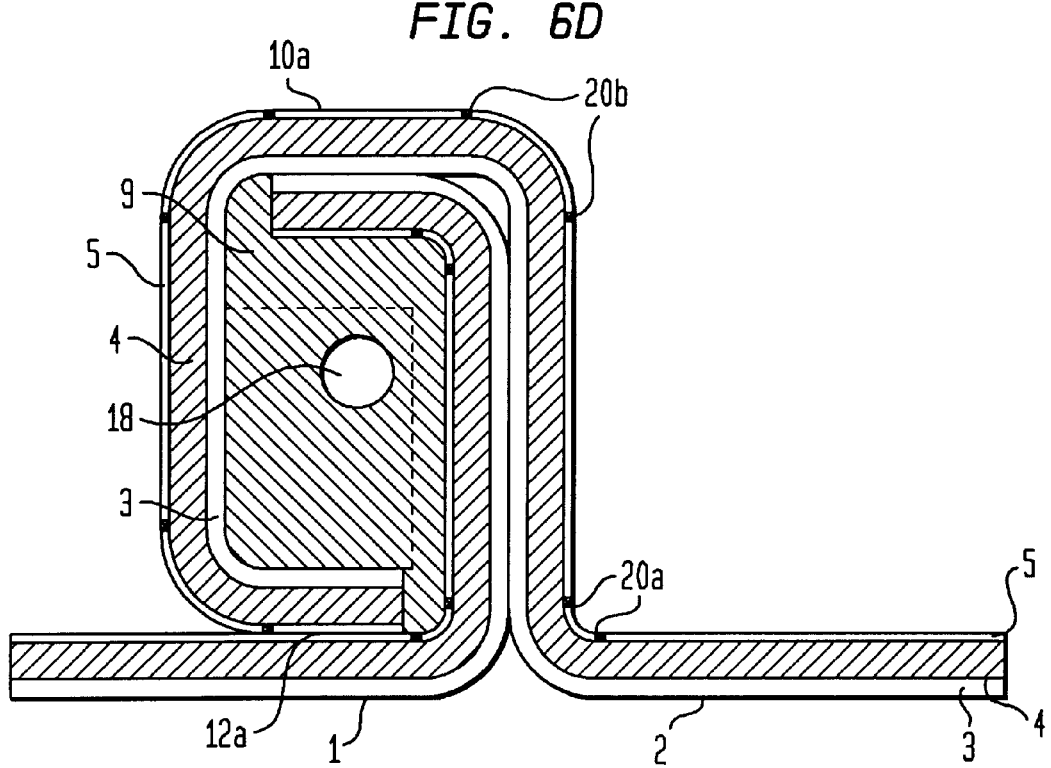

FOAMED METAL PREFORMED BODY

The invention relates to foamed metal preformed bodies and a method with which a metal foam material of a preformed body is foamed during fabrication of the preformed body.

It is especially in lightweight structural engineering that there has always been a problem in joining individual structures—termed preformed bodies in the following—in keeping with the requirements of the later application, not least due to the demand for low weight while at the same time ensuring high mechanical loading capacity and stability at low cost. This is also basically a problem in other fields, for instance, in shipbuilding where particularly large-area preformed bodies, for example hull segments, need to be joined to each other, although here too, there is always the requirement for the smallest deadweight possible while assuring high mechanical loading capacity of such preformed bodies and the composite bodies composed thereof.

One possibility of saving weight is to make use of preformed bodies of foamed metal foam material or fractions of such materials. The pore structure of the frothed or foamed foam metal results in a frothed or foamed metal preformed body having a lower weight than a solid metal preformed body while still assuring high mechanical loading capacity. Aside from this, metal foam material features a whole series of additional advantageous properties, such as, for example, high shock absorption, noise absorption, as well as a reduced heat conductivity and electrical conductivity as compared to the solid material. To achieve these advantageous properties the foamed material needs to have a foam or porous structure as uniform as possible.

Metal foam materials and the semi-finished products and preformed bodies produced therefrom are known, for example, from DE 41 01 630 C2, DE 43 18 540 A1, DE 44 16 371 A1, DE 44 26 627 A1, DE 196 12 781 C1 and DE 197 17 894 A1. Proposed in DE 43 18 540 A1 is the use of metal foam material in automobile production in which body panels are employed as foamed metal preformed bodies comprising a solid metal skin and a foamed layer of metal foam. For securing fitted items to these body panels mention is made of self-cutting screws and dowel-type fasteners. DE 196 12 781 C 1 likewise relates to preformed bodies for motor vehicles. In the publication "Metallschäume 1997", MIT Bremen, in the article entitled "Joining of Aluminum Foams" by N. Sedliakova et. al., screw fasteners, soldered, cemented and welded joints as well as the use of foamed fasteners are described as methods for joining foamed metal preformed bodies. These are the accepted methods for joining preformed bodies, the advantages and disadvantages of which are well known in engineering.

An object of the invention is to provide a foamed metal preformed body having a structure of the foamed metal foam material which is favorable for the intended purpose of the preformed body. For the majority of purposes of the preformed body, it is desirable that the porous structure of the foamed metal is as uniform as possible.

This object is achieved by the subject matter as set forth in the independent claims.

The invention relates to a preformed body comprising foamed metal foam material cited in the following as a foamed metal preformed body due to this property.

The foamed material may totally fill a preformed body configured hollow.

The foamed material may be sited also only in one or more zones of the preformed body, where it fills out cavities, or it may also reinforce only one structural part of the preformed body or join structural parts.

In accordance with the invention, the metal foam material is thermally treated internally during foaming. A thermal treatment means is conducted through the metal foam material. The thermal treatment means may be arranged so that is only comes into immediate contact with the material to be foamed when actual foaming has commenced. However, the thermal treatment means can also already come into direct contact with the metal foam material before the material is foamed to, for example, already initiate foaming of the material. Foaming may be supported or even first made possible when, for example, introducing heat to the zone of the thermal treatment means is not possible due to the low thermal conductivity of the foamed metal or possible only to an inadequate degree for foaming. The thermal treatment means may also serve merely as a coolant, or in addition to heating.

The thermal treatment means involved is preferably a flow conduit for communicating, or also merely for introducing, a thermal treatment fluid through or into the zone of the preformed body in which the metal foam material is located. The thermal treatment means may, however, also be formed in principle by some other means such as, for example, an electrically conducting wire of a resistance heating element if only internal heating is to be implemented during foaming. By means of a flow conduit, heating or cooling is optionally possible to advantage within the structure of the metal foam material. With such a thermal treatment means, the metal foam material is heated during its foaming or cooled to discontinue foaming or subsequent to foaming. Also applicable is a combination of two or all three thermal treatment procedures. It is particularly of advantage when the complete foaming procedure is controlled by thermal treatment. The foamed material is heated internally for foaming and, if necessary, maintained at a temperature by means of internal thermal treatment, which, in contrast to external heating, is very accurately adjustable and uniform throughout the foamed metal, and cooled for consolidation.

Internal thermal treatment permits highly accurate thermal treatment of a localized zone in which metal foam material is arranged. Zones are thus attained in which, due to the shape of the preformed body and the amounts of foamed metal located therein, cold or hot spots could materialize should heating or cooling be done merely externally. Directly adjoining zones may even be heated and cooled simultaneously. Zones may be protected from excess heat entry. Heating may be done internally and cooling externally, and vice-versa. Accordingly, the choice of materials possible for the dimensionally stable structural parts during foaming is greater. Different foam materials may even be combined in that a material having a low foaming temperature due to the internal thermal treatment is specifically protected against excessive heating of an adjoining material having a higher foaming temperature.

The result of the above is that foaming any shape of preformed body is made possible. By means of internal thermal treatment, preformed bodies of any internal geometry and also any outer dimensions may be foamed, for which, otherwise, special ovens would need to be built. Such preformed bodies may be foamed fully or partly as a whole in a single heating operation.

A preformed body foamed with foamed metal in accordance with the invention is characterized by a thermal treatment means, preferably at least one flow conduit for a thermal treatment fluid, being guided through the foamed structure. In one preferred embodiment, thermal treatment fluid is passed through in counterflow. For this purpose, two flow conduits, through which the thermal treatment fluid is passed in counterflow, may be oriented closely spaced in parallel or in direct thermal conductive contact with each other. In both flow conduits, thermal treatment fluid is introduced at the desired temperature and passed through in counterflow. Along the pair of flow conduits, the thermal treatment temperature materializes particularly uniform. Instead of a thermal treatment fluid passing through flow conduits separately in flow, it may also be passed through the two flow conduits in sequence. In both flow guidance arrangements, one of the two flow conduits may surround the other.

Cooling the foamed metal internally during its foaming prevents uncontrolled further foaming of the foam material. The foaming procedure is purposefully concluded; the foaming action being stopped as soon as the desired homogeneous foamed structure has materialized, thus preventing individual pores in the foam from being expanded to such an extent that they would ultimately collapse. Without the controlled internal thermal treatment in accordance with the invention, in particular inner cooling, there would always be the risk of the walls of the pores becoming so thin, due to the expansion, that they are no longer stable and "weepage" of the remaining foamed metal would occur, resulting in large voids materializing in the preformed body. This effect being known as the "drainage" effect. In accordance with the invention, this is prevented by the controlled internal thermal treatment.

In the foamed zone, several of the pairs of flow conduits as described above may be arranged. Indeed, combinations of both single and pairs of flow conduits may also be formed.

Due to this nested flow conduit configuration and guidance of the thermal treatment means through the same in counterflow, the temperature of the thermal treatment means and, thus ultimately, of the foamed metal is set particularly uniformly over a long length of flow conduit. In accordance with one particularly preferred embodiment of nested flow conduits, one outer flow conduit accommodating an inner flow conduit is closed off at one end which may be located in the foamed metal. For foaming, the hot thermal treatment fluid is introduced into the inner flow conduit, through which it flows, and emerges therefrom at the closed end of the outer flow conduit to enter therein before then flowing in the intermediate space between the inner and outer flow conduit back to a thermal treatment means. In this arrangement, a compensation in the heat occurs between the thermal treatment fluid in the inner flow conduit and the return flow of thermal treatment fluid. This results in a particularly uniform temperature of the return flow of the thermal treatment fluid over the full length of the flow conduit.

Instead of the blind thermal treatment means as described above, in which the thermal treatment fluid is led in and out at the same end, the thermal treatment fluid may also be led in and out at the opposite ends of these flow conduits in each case. This is only possible, however, when the inner and outer flow conduits are brought out at both ends from the metal foam zone. Accordingly, in the following, reference is made simply in general to an outer flow of fluid instead of a return flow of fluid.

The inner flow conduit is preferably located over its full length centrally spaced away from the outer flow conduit. This may be achieved by means of spacers arranged between the inner flow conduit and the outer flow conduit. These spacers are made of a heat resistant material, for instance of ceramics.

Preferably, the outer flow of the thermal treatment fluid flowing is turbulent, as a result of which the heat conducted from the inner flow conduit into the outer flowing thermal treatment fluid and from the outer flowing thermal treatment fluid to the foamed metal is enhanced as compared to that of a laminar flow. The spacers may be configured accordingly as the means for producing turbulence. It is particularly preferred to produce the turbulent outer flow by means of a tape, wound spirally around the inner flow conduit.

In the preferred embodiment, such a tape simultaneously serves as a spacer, i.e. no further spacers are needed in addition thereto. Preferably, the tape is configured as a woven tape, more particularly of heat resistant fibers such as e.g. glass, ceramic or carbon fibers. Due to the tape being wound spirally around the inner flow conduit, the thermal treatment fluid is, likewise, guided and swirled spirally in the intermediate space between the inner and outer flow conduits.

If the flow conduits are formed by tubes, these tubes are at the foaming temperatures of e.g. 500 to 800° C. in the case of aluminum foam material, above the softening temperature of a whole series of metallic materials which, where aluminum is concerned, is approximately 180° C. When aluminum is selected as the material for the flow conduit, the foaming temperature of the aluminum foam is near to or already above the solidus temperature of aluminum of approximately 660° C. Accordingly, there is thus the risk of the flow conduit(s) being squeezed in the metal foam zone due to the material foaming there. Preferably, the flow conduit or several flow conduits is/are made of a heat resistant material, preference being given to glass, ceramics, carbon and/or other heat resistant materials, especially fiber materials. To improve the thermal conductivity of the particularly heat resistant material, fibers of another material are worked into the material of the flow conduits, the solidus temperature of this other material being significantly above that of the metal foam material used. In the event of aluminum foam being used, it is preferred that these worked-in heat conducting fibers are fibers of graphite, molybdenum and/or tungsten. The melting temperatures of these materials are significantly above 2000° C. and the thermal conductivity at 20° C. amounts to at least 130 W/mK. Instead of the materials cited by way of example, other materials having a sufficiently high melting temperature and an adequately high thermal conductivity, especially having a melting temperature exceeding 2000° C. and a thermal conductivity of at least 130 W/mK may also be employed. Provided that a heat resistant and pressure resistant material is concerned which simultaneously also has a good thermal conductivity and is compatible with the material to be foamed, the flow conduit (s) may also be entirely made of such a material; graphite being one example of such a material.

In the event of using nested flow conduits, the outer flow conduit may remain in the metal foam structure upon completion of the foaming procedure. The remaining outer flow conduit improves the mechanical properties of the preformed body, especially when the internal thermal treatment is undertaken in a jointing zone of several preformed bodies. The inner flow conduit as well as the spacers, or the fiber tape may be preferably removed from the outer flow conduit to be available for repeat use. The inner flow conduit and the spacers, or the fiber tape replacing the spacers, may, likewise, remain in the metal foam structure, however. By preferably filling out the cavity, surrounded by the outer flow conduit, with plastics material, the preformed body or the composite zone may be further reinforced mechanically. In all of the cases cited a fiber-reinforced metal preformed body materializes. It is particularly preferred to make use of a flow conduit or nested flow conduits made of carbon fiber material, thus resulting in carbon-reinforced foamed metal preformed bodies.

A thermal treatment system comprises preferably an internal combustion engine with a turbocharger, the exhaust air being employed as the heating fluid, the intake air to the charger being used as the cooling fluid. The force driving the engine may be used to generate electricity.

The thermal treatment means may be used during repair work to reduce the heat introduced into the foamed preformed body to a safe degree, this being particularly of advantage when. repairing after foaming a joint as preferred.

The thermal treatment means also forms a mechanical reinforcement of the foamed preformed body and is arranged to advantage also in a way optimum in this respect, thus resulting also in a fiber composite body in which a thermal treatment means forms a fiber.

The flow conduit may be perforated to bring the thermal treatment means into direct contact with the foam material.

In another preferred embodiment, the metal foam material is charged from within by a fluid, preferably an inert gas or reaction gas by means of which the oxidative effect of a foaming agent contained in the foamable metal foam material is reduced or increased. A perforated flow conduit, arranged for this purpose in the jointing zone, may be formed by the aforementioned thermal treatment flow conduit; although a separate further flow conduit having small openings, i.e. a perforated flow conduit may be incorporated. In the case of nested flow conduits, the outer flow conduit, of course, would be perforated.

The thermal treatment fluid and the fluid for controlling an oxidation may be formed by one and the same fluid.

A preformed body preferably used is fabricated from a slab of laminated material comprising at least one layer of a foamable metal foam material and an adjoining skin of a metallurgically compatible solid metal material. From such a semi-finished product, a preformed body in accordance with the invention is produced by known forming methods, more particularly cold forming. Typically, both the foamed material and the solid material is formed by the same metal or the same metal alloy, for example, foamable aluminum foam and solid aluminum. However, any compatible unlike pairing of materials is just as usable for the purposes of the invention, the foaming temperature of the foam material being preferably below the melting temperature of the solid material. The foam material of one or more preformed bodies may be foamed even prior to jointing. One or more of the preformed bodies to be joined may also consist only of the metal foam material.

However, the invention is not restricted to application with preformed bodies containing foam metal materials, it also being applicable to advantage with metallic preformed bodies having no foam material, for example with conventional sheets of metal or other sections or shells. In addition, preformed bodies obtained by sintering or casting, for example, may be involved. The invention is, although preferred, not restricted exclusively to metallic preformed bodies. In principle, any kind of preformed body may be foamed by means of the internal thermal treatment in accordance with the invention, as long as these preformed bodies are not ruined by the foaming temperature of the foam material used in each case; preferably they should remain dimensionally stable at the foaming temperature. As already mentioned, the invention provides in this respect additional freedom, also as regards selecting the material.

Connected to the thermal treatment means is preferably at least one structured thermal treatment sheeting increasing the outer surface area of the thermal treatment means. The structured thermal treatment sheeting protrudes from the thermal treatment means into the foamed metal. Between the structured thermal treatment sheeting and the thermal treatment means, an optimal thermal conductivity should exist. These additional thermal treatment surface areas of the structured thermal treatment sheeting act as cooling and/or heating fins, In one preferred embodiment, one such structured thermal treatment sheeting is formed by several surface areas oriented at an angle to each other. Preferably, each two adjoining thermal treatment surface areas are oriented at an angle to each other in the range 90 to 140°, preferably 110 to 130°. It is particularly preferred that these surface areas comprise in their edge portion, or in an imaginary edge portion should the surface areas fail to come up to the imaginary edge, an angle of 120° relative to each other or almost 120°. This enables the liquid metal material, defining the individual pores or foam bubbles during foaming, to be in particularly good contact with the additional thermal treatment surface areas so that the thermal conductivity in the structure of the foamed metal is particularly good.

In the first embodiment, such additional thermal treatment surface areas are configured as structured metal sheet formations. For this purpose, flat sheeting having a pocket or dished structure, produced by stamping for instance, may be provided. In another preferred embodiment, zig-zag lengths of sheet metal strip are employed as additional thermal treatment surface areas. Both embodiments comprise two surface areas merging at an edge or their imaginary elongations at an angle as described above. The one pocket has a size corresponding to a third or two-thirds of the expected average size of a single foam bubble or pore. Preferably, the volume of the single pocket is half the size of the expected average volume of a foam bubble or pore.

A thermal treatment flow conduit is maintained in the desired position preferably by means of spacers in the preformed body to be foamed. Preferably, a spacer forms an additional thermal treatment surface area.

Internal thermal treatment is employed to advantage in a jointing method in which preformed bodies are compacted into a solid composite body with the aid of a metal foam material. For this purpose, in a first step the preformed bodies to be joined are located relative to each other in their positions as desired for the composite, preferably by being clamped to each other. In their jointing zone, use is made of a jointing clamp to define a space, more particularly a cavity, to thus form an encasement in which foamable metal foam material is arranged. The metal foam material may be brought into the space encased by the jointing clamp either prior to, during, or after joint clamping. In a second step, the foamable metal foam material is foamed, this being preferably done by heating it to the foaming temperature of the metal foam material. Due to the increase in volume of the metal foam material involved in foaming and it being limited by the sufficiently solid encasement, the preformed bodies are compacted into a composite body. The jointing clamp itself is understood as a preformed body according to the invention.

In a first preferred embodiment, a prefabricated, separate jointing clamp is employed as the jointing clamp. This separate jointing clamp is placed on the preformed bodies to be joined, the preformed bodies having been preferably arranged matching each other in the shape of the later composite, by it clasping the preformed bodies or at least parts thereof. In this arrangement, the jointing clamp may already clampingly locate the preformed bodies to be joined together in their desired position for the composite relative to each other. A non-clamping application of the jointing clamp is likewise possible, however.

In accordance with a second preferred embodiment, the jointing clamp is formed by the corresponding configuration of the preformed bodies themselves so that affixing a separate jointing part may be eliminated. In this case, the jointing clamp is an integral component of one of the preformed bodies or is formed in the cooperation of the preformed bodies.

By inserting a suitable supplemental section, foam material may be brought into the foaming zone optimized in quantity and form as regards the foaming procedure and the subsequently foamed preformed body. In this way, should the preformed body not contain any foamable metal foam material itself in the foaming zone, foam material is furnished at least by a supplemental section.

Figure 1B:
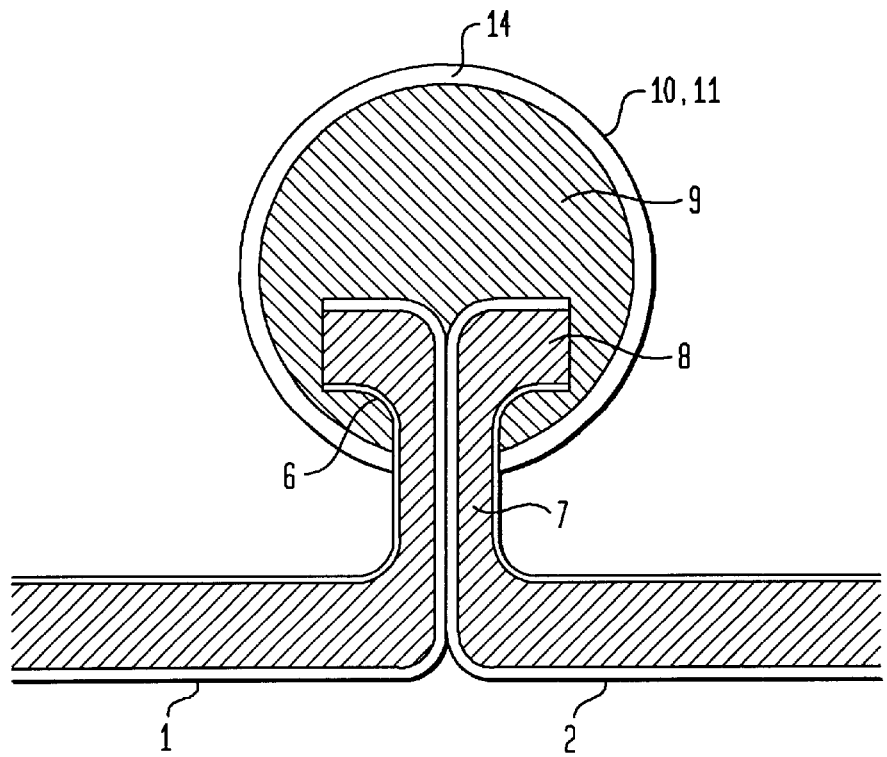
Figure 2A:
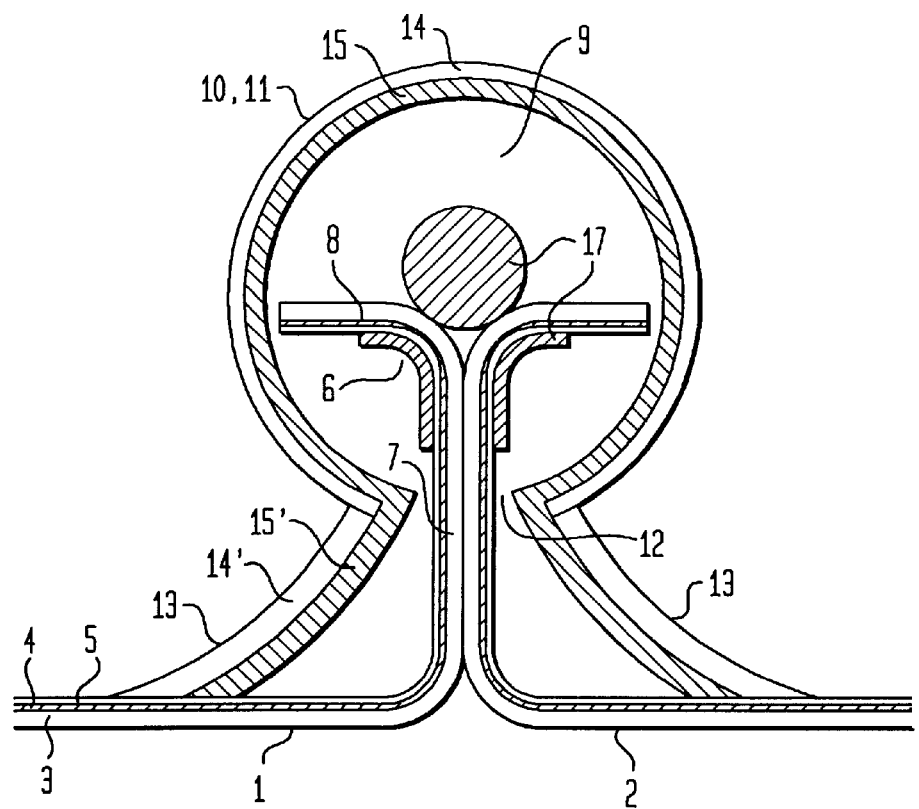
Figure 2B:
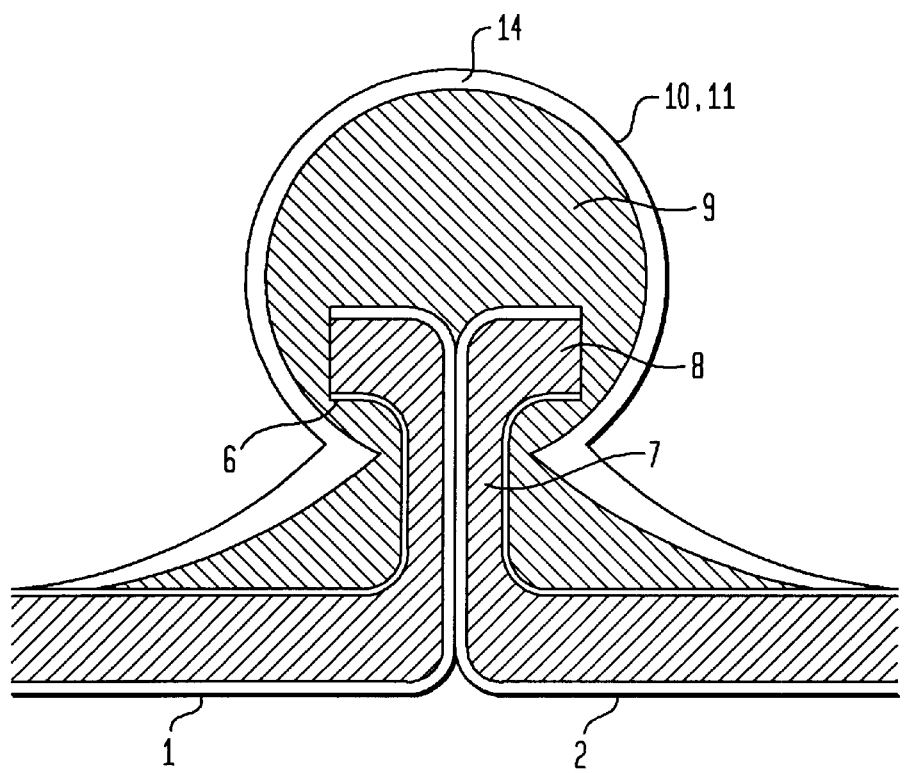
Figure 3A:
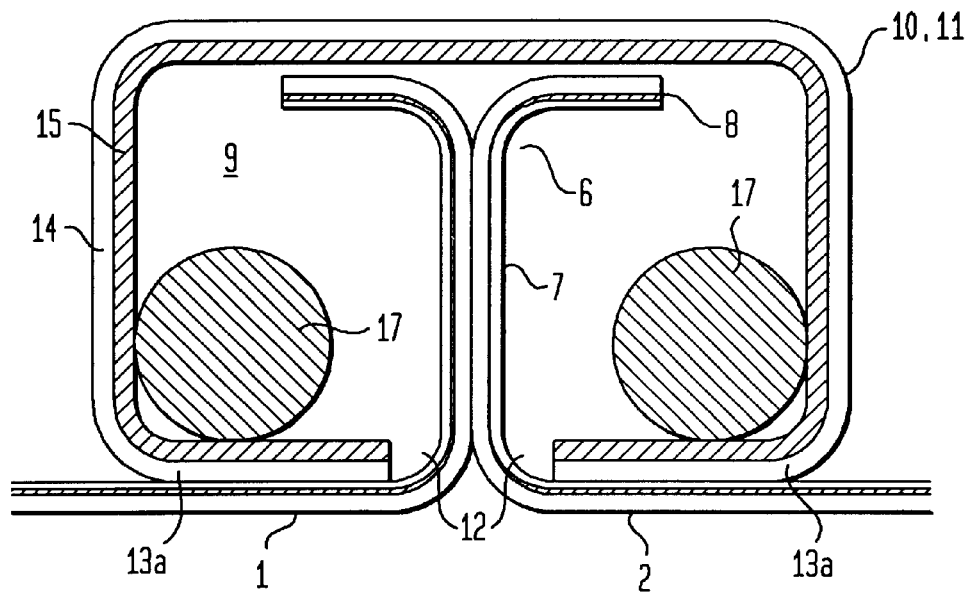
Figure 3B:
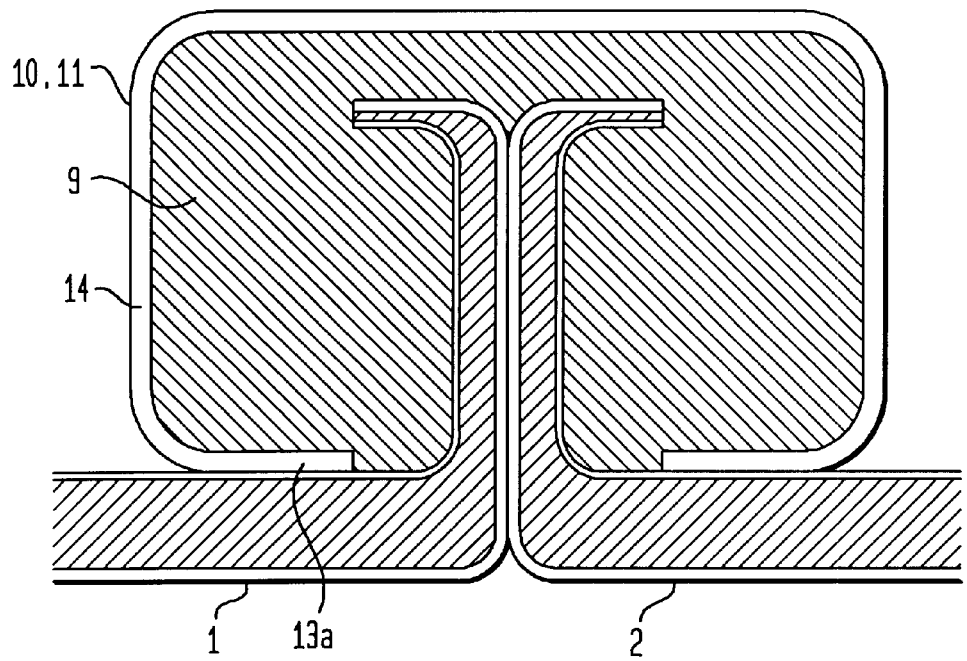
Figure 4A:
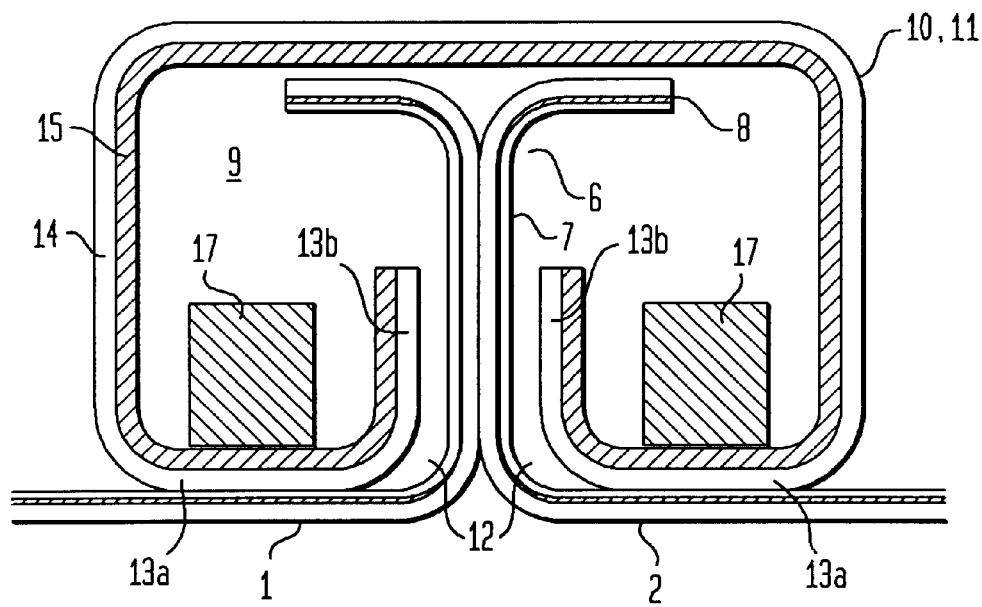
Figure 4B:
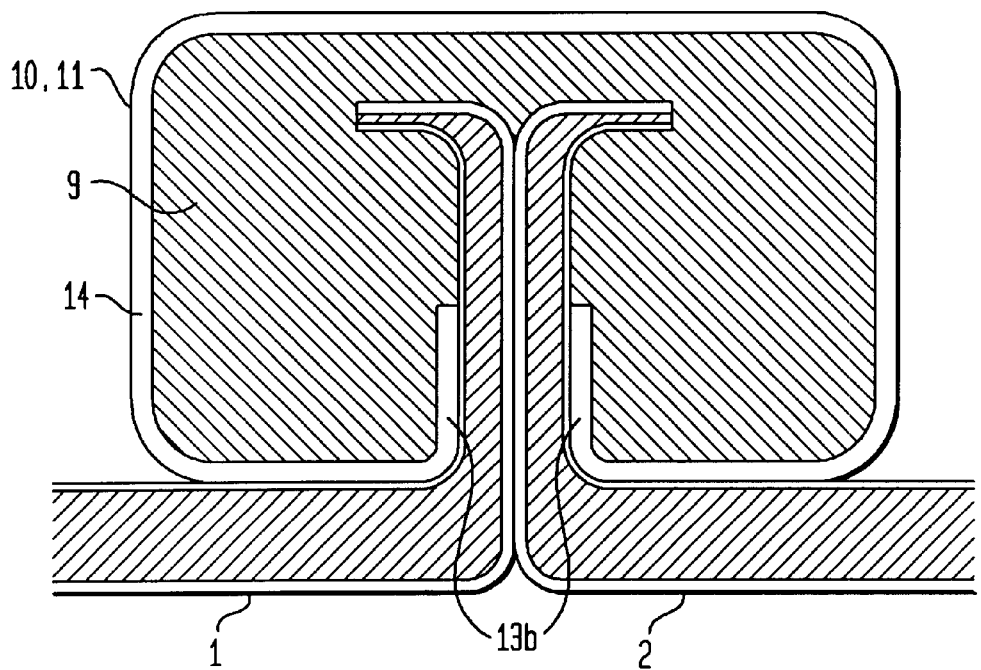
Figure 5A:
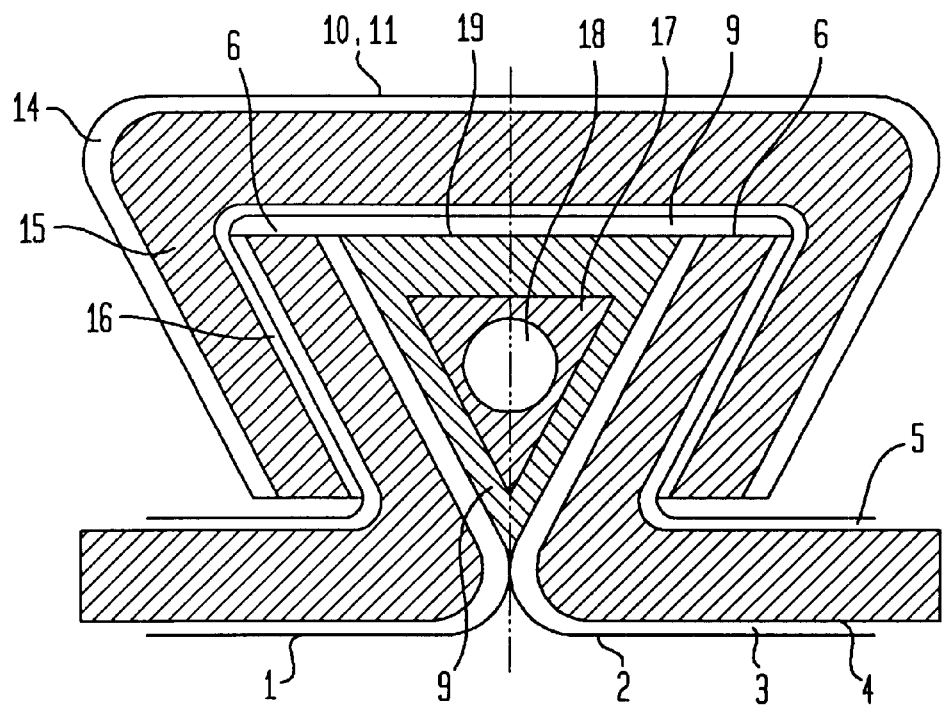
Figure 5B:
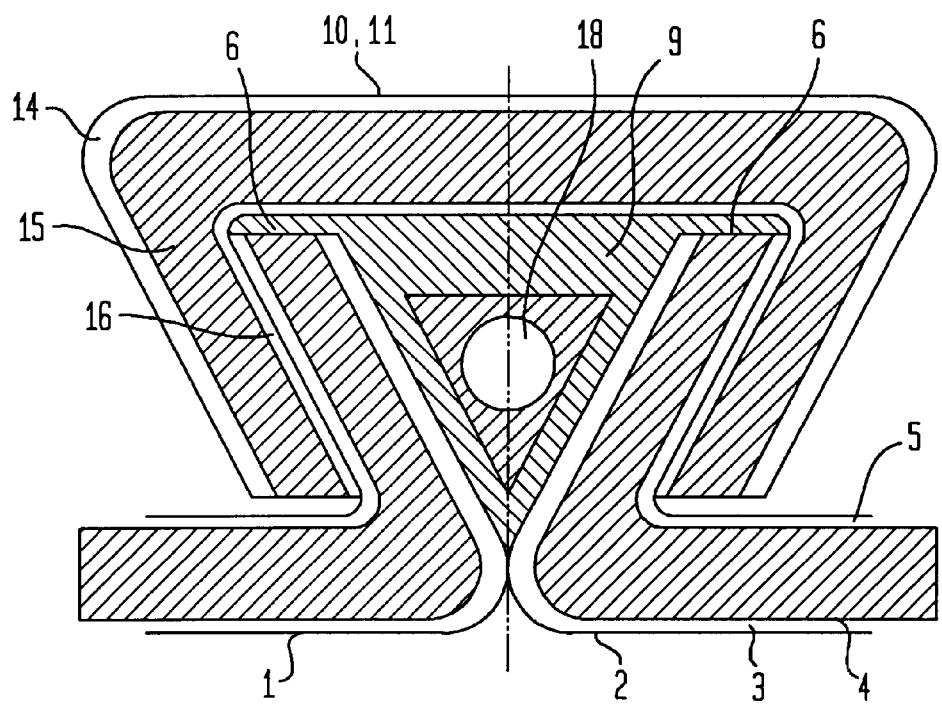
Figure 6A:
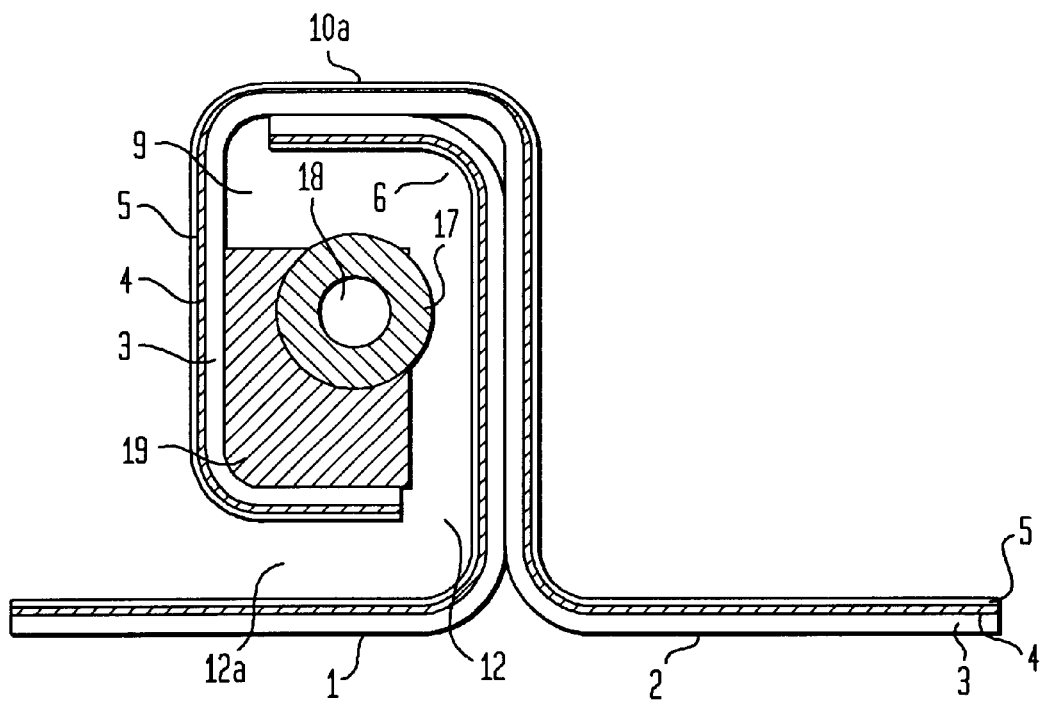
Figure 6B:
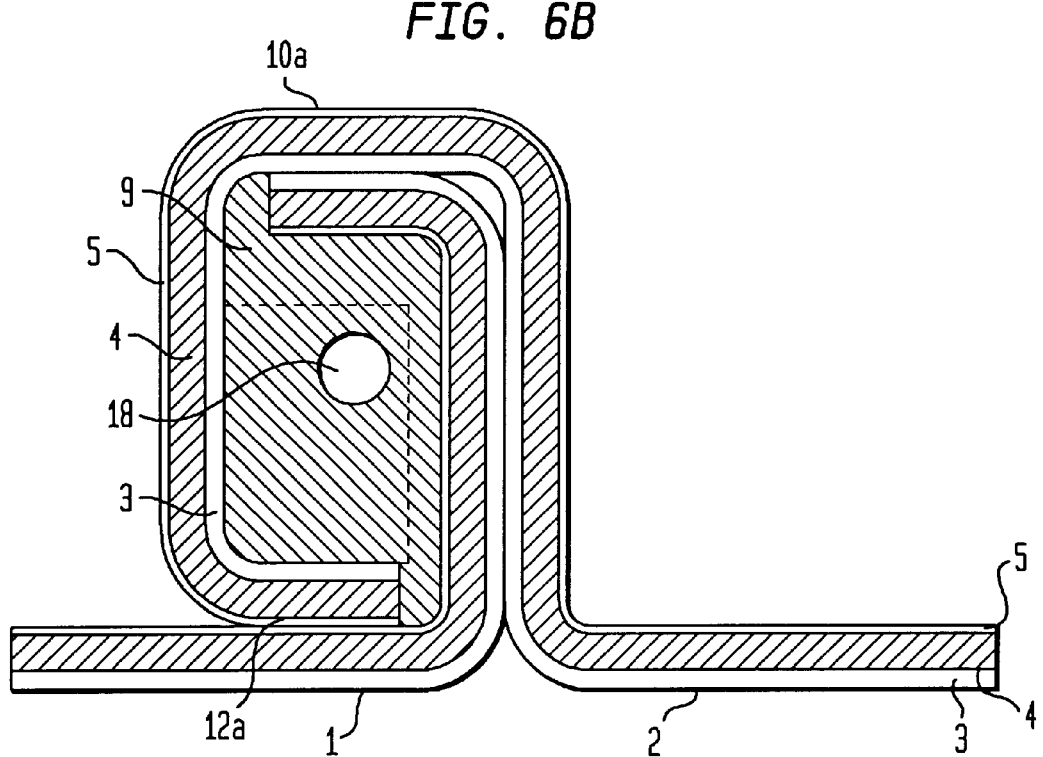
Figure 7A:
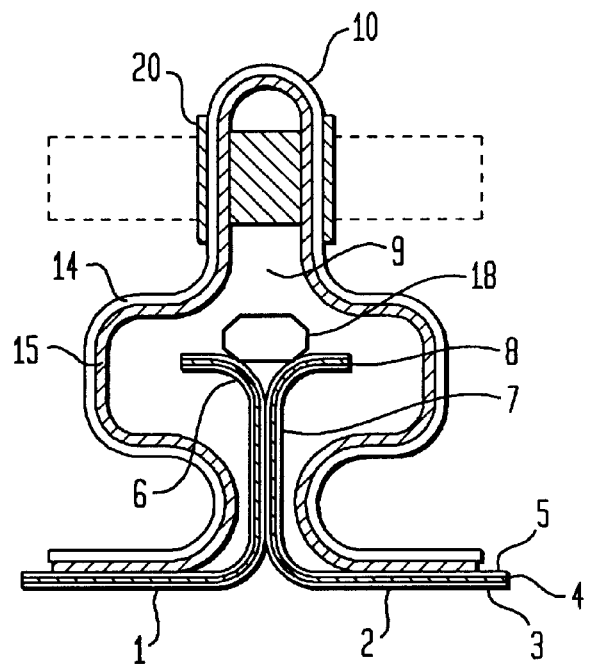
Figure 7B:
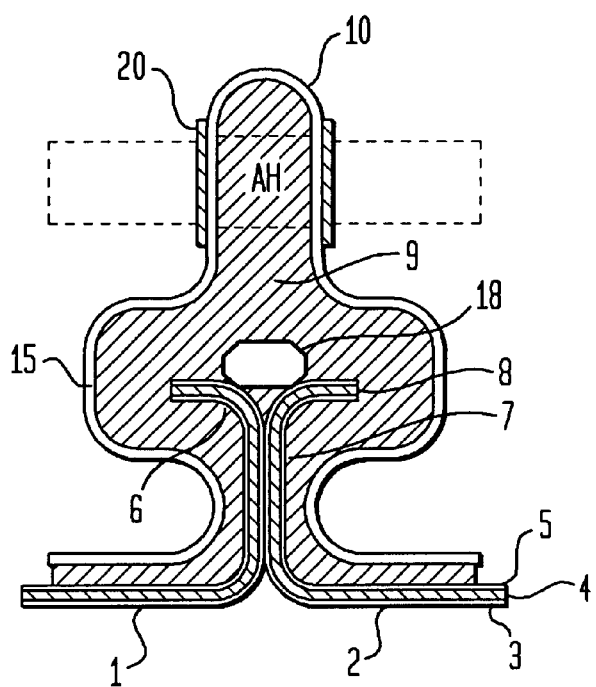
Figure 8:
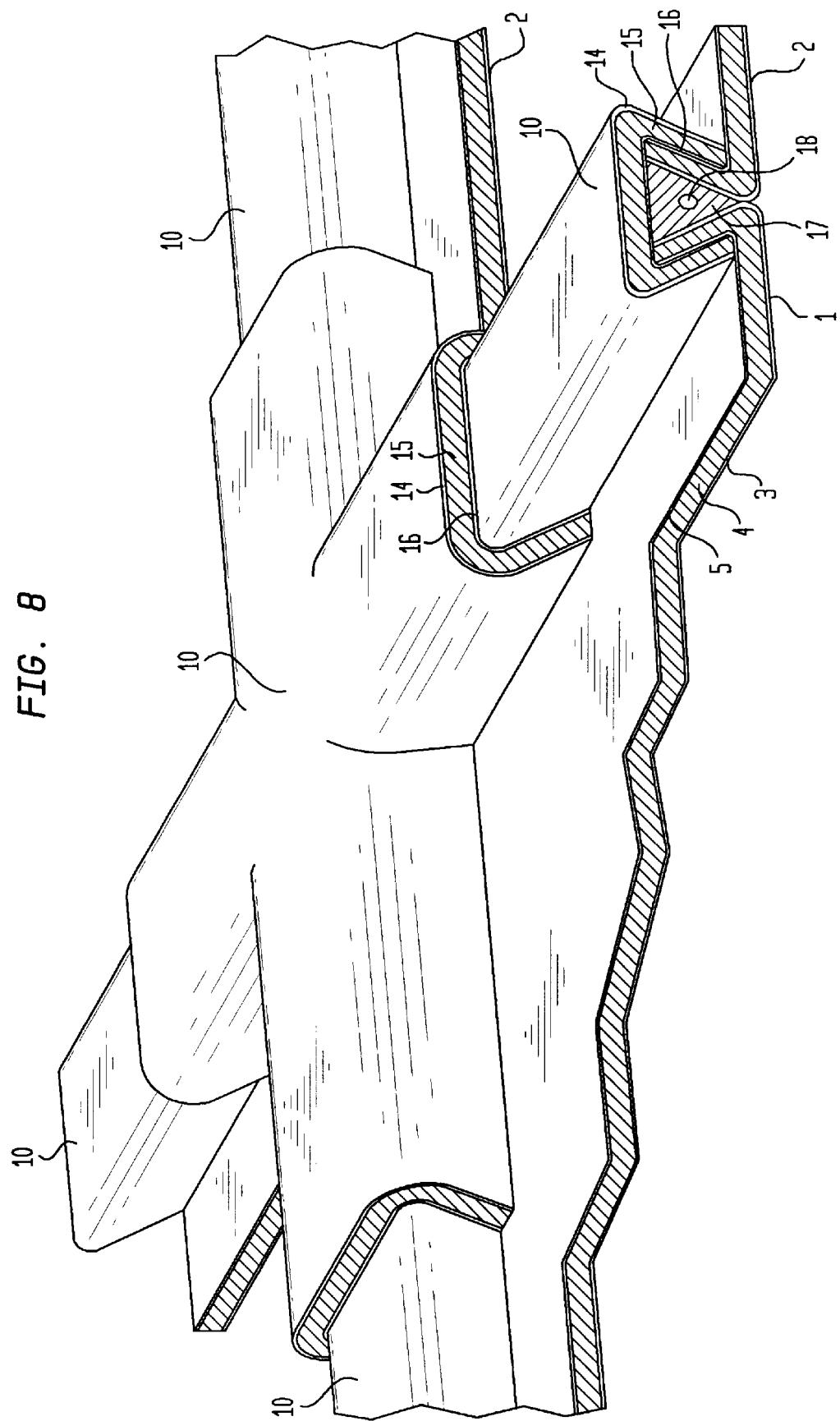
Figure 9A:
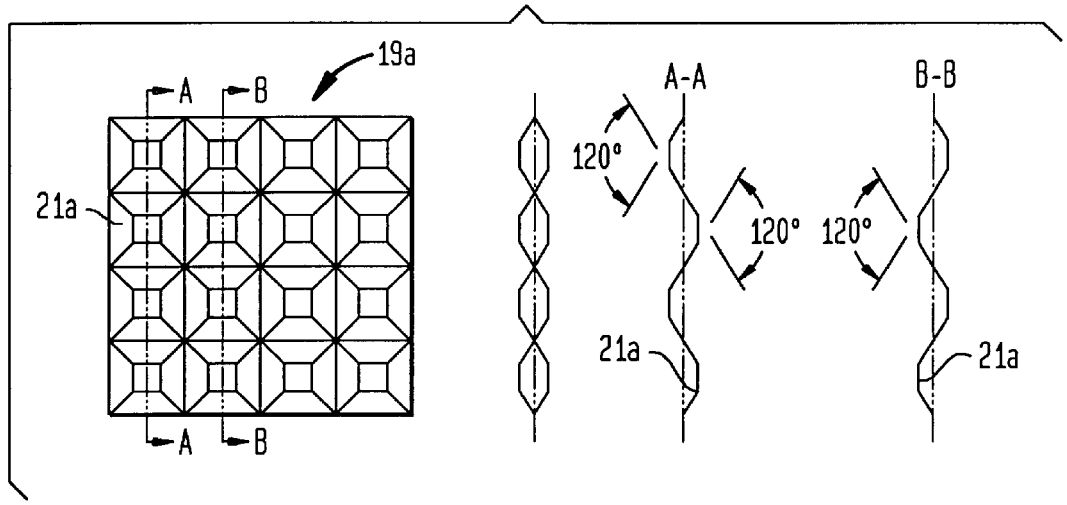
Figure 9B:
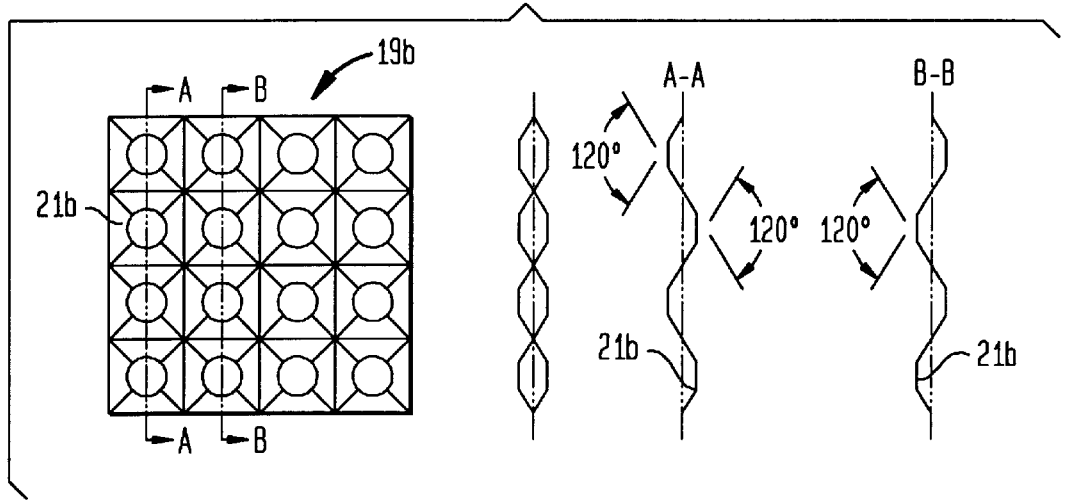
Figure 9C:
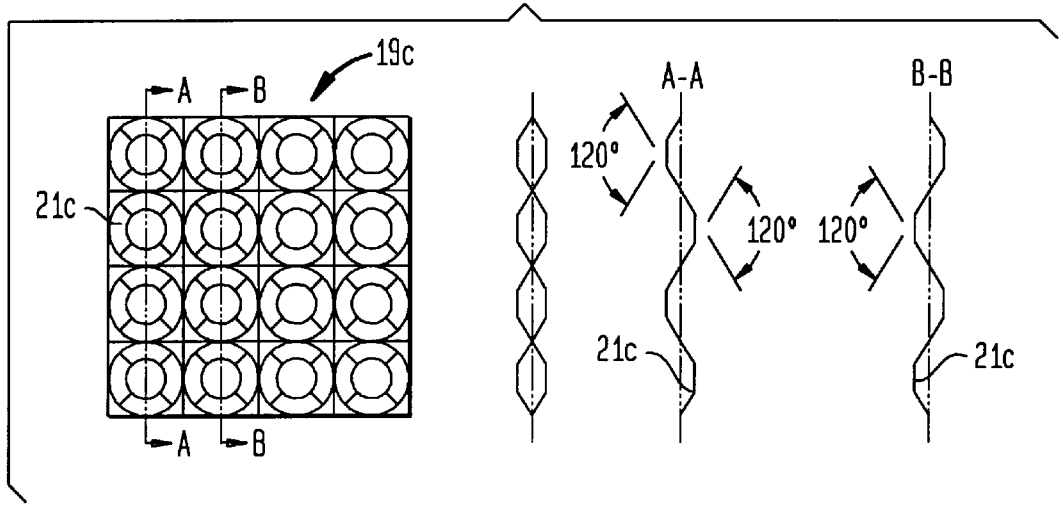
Figure 9D:
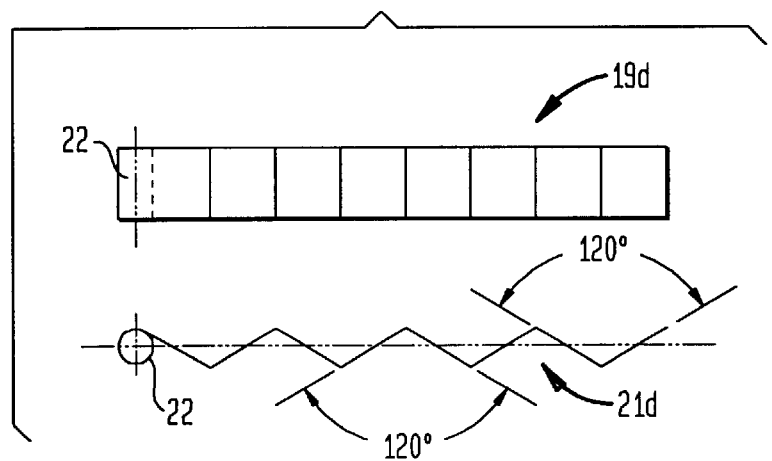
Figure 10:
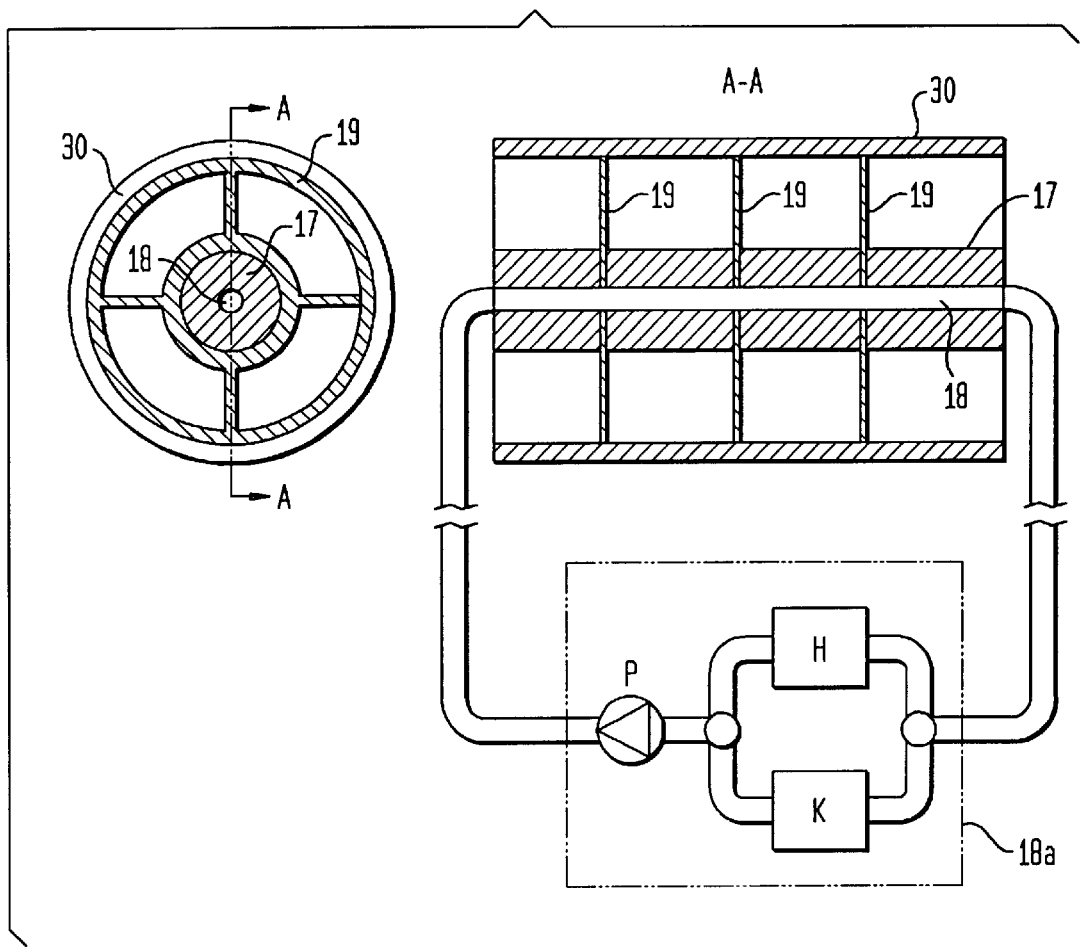
Figure 11:
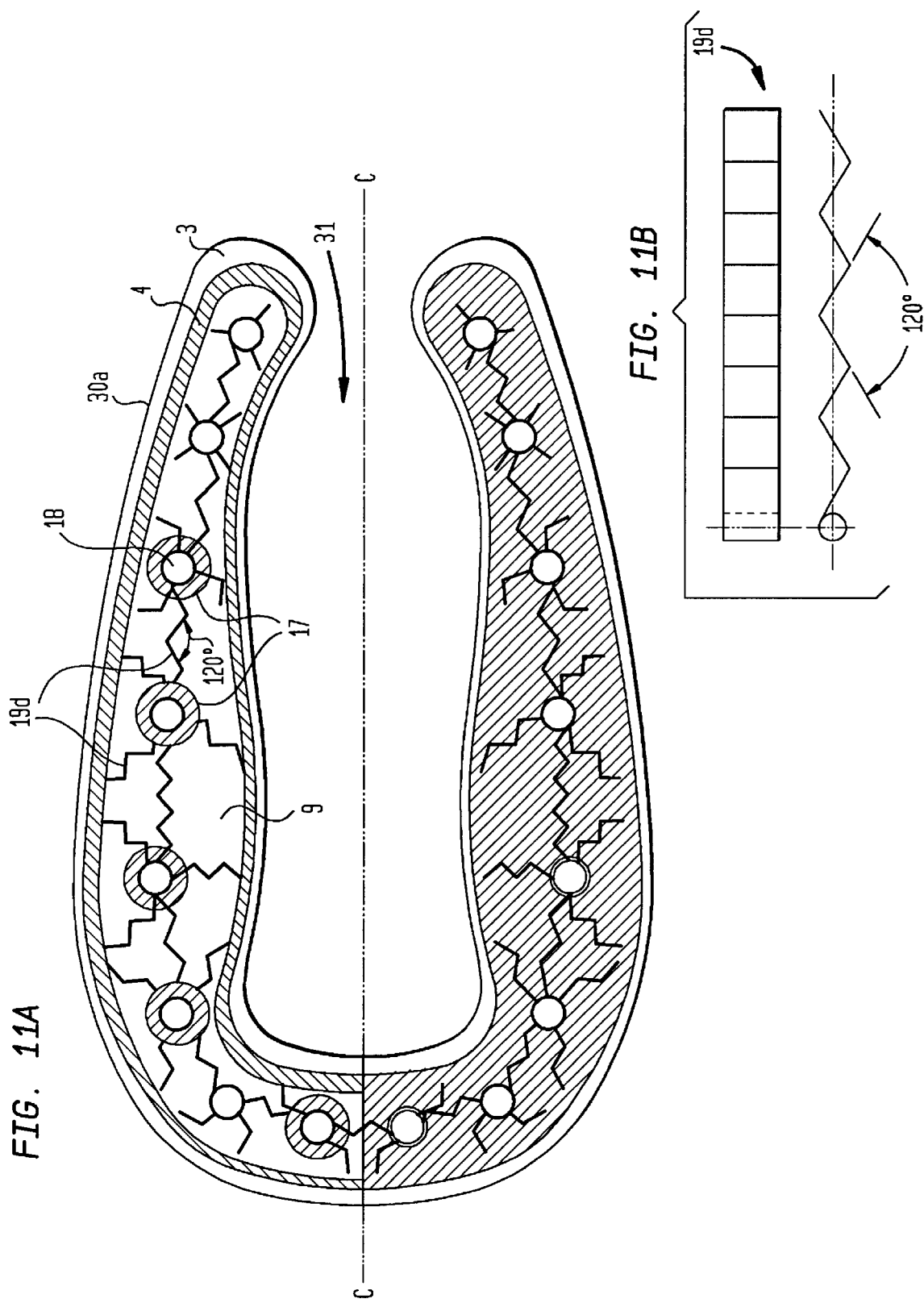
Figure 12:
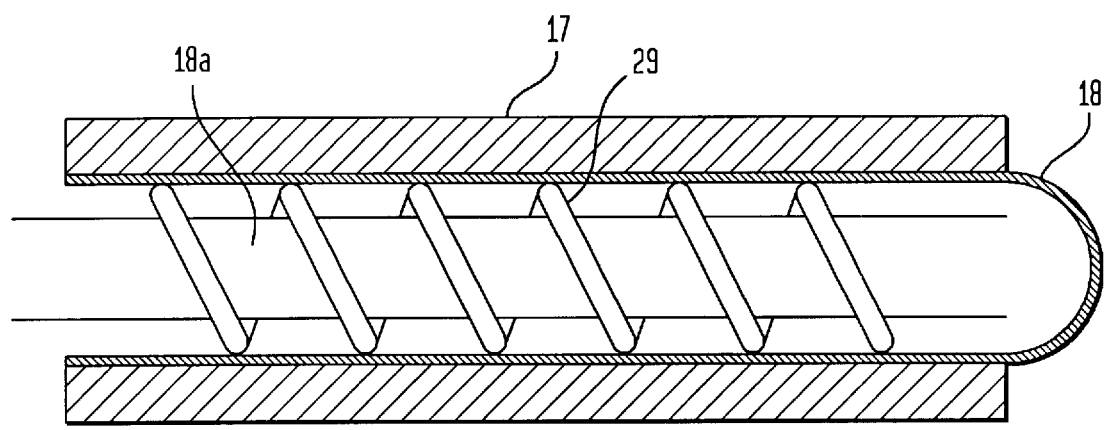

Preferred example embodiments will now be detailed with reference to the figures in which:

FIG. 1a is a cross-sectional view of two preformed bodies and a jointing clamp in position for a joint, FIG. 1b is a cross-sectional view of the joint, as shown in FIG. 1a, after foaming, FIG. 2a is a cross-sectional view of two preformed bodies and a jointing clamp, including a sustaining section, in position for a joint, FIG. 2b is a cross-sectional view of the joint, as shown in FIG. 2a, after foaming, FIG. 3a is a cross-sectional view of two preformed bodies and a rectangular jointing clamp in position for a joint, FIG. 3b is a cross-sectional view of the joint, as shown in FIG. 3a, after foaming, FIG. 4a is a cross-sectional view of two preformed bodies and a rectangular jointing clamp with internal legs in position for a joint, FIG. 4b is a cross-sectional view of the joint, as shown in FIG. 4a, after foaming, FIG. 5a is a cross-sectional view of two already foamed preformed bodies and a trapezoidal jointing clamp, likewise already foamed, in position for a joint, FIG. 5b is a cross-sectional view of the joint, as shown in FIG. 5a, after foaming, FIG. 6a is a cross-sectional view of two preformed bodies with an integrated jointing clamp in position for a joint, FIG. 6b is a cross-sectional view of the joint, as shown in FIG. 6a, after foaming, FIG. 6c is a cross-sectional view of the joint, as shown in FIG. 6a, but with slotted skin plates of the preformed bodies, FIG. 6d is a cross-sectional view of the joint, as shown in FIG. 6c, after foaming, FIG. 7a is a cross-sectional view of two preformed bodies and a jointing clamp, including a mounting or load suspension sleeve, in position for a joint, FIG. 7b is a cross-sectional view of the joint, as shown in FIG. 7a, after foaming, FIG. 8 is a cross-sectional view of a cross-type composite FIGS. 9a–d are illustrations of spacers, FIG. 10 is a cross-sectional view of a tubular section, including thermal treatment conduit and supplemental sections, FIG. 11 is a cross-sectional view of a tubular section, including thermal treatment conduits, spacers in accordance with FIG. 9d and supplemental sections, and FIG. 12 is a cross-sectional view of a foamed metal zone with nested flow conduits.

Referring now to FIG. 1a, illustrated is a cross-sectional view through a jointing zone of a first preformed body 1 and a second preformed body 2. The preformed bodies 1 and 2 are segments preformed in accordance with the later intended purpose, for example, body panels of a motor vehicle or hull or fuselage segments of a ship and aircraft respectively. For producing the preformed bodies 1 and 2, slabstock is used consisting of a foamable layer 4 of a metal foam material sandwiched between a lower and an upper solid metal skin 3 and 5 respectively. The laminated composite in the slabstock for the preformed bodies 1 and 2 may be fabricated for example by means of cementing or diffusion bonding, it being from such a slabstock that, after parting, the preformed bodies 1 and 2 are obtained by cold forming.

Configured by double folding at each of the preformed bodies 1 and 2 along one of its side edges is a joining section 6. Such a joining section 6 in the form of a flanged edge comprises a first web 7, jutting from the corresponding preformed body 1 and 2 respectively, and a second web 8 adjoining thereto, folded back to the same preformed body. In the example embodiment, the second web 8 runs parallel to, and spaced away from, the end portion of the corresponding preformed body 1 and 2 respectively located below. To produce a preformed body composite, the preformed bodies 1 and 2 are located and locked in place with their joining sections 6 abutting. Subsequently, a jointing clamp 10 is applied so that the abutting joining sections 6 are clasped by the jointing clamp 10.

The jointing clamp 10 is formed by a tubular cylindrical section 11 of circular cross-section, which, in its longitudinal direction, is opened up by the straight opening 12, extending from one face to the other. The jointing clamp 10 is likewise produced from a metal foam slabstock. For this purpose, the slabstock is cut into a rectangular shape and is cold formed into the tubular cylindrical section, for example, bent or rolled. It is just as possible to produce it from a tubestock by machining the longitudinal opening 12. The semi-finished product of the jointing clamp 10 is likewise a laminate, in the example embodiment as shown in FIG. 1a it is a two-layer material, comprising a foamable layer 15 of a metal foam material and a solid metal skin 14 of the same metal. Forming a composite between the two layers 14 and 15 may be done, for example, by cementing or diffusion bonding. In the tubular cylindrical section 11, the foamable layer 15 forms the inner layer sandwiched by the outer skin 14.

After lay-up, the jointing clamp 10 clasps the two abutting joining sections 6. Their longitudinal edges defining the opening 12 locate on both sides of the joining sections 6 in the region of the first webs 7. Between the first webs 7 and the longitudinal edges of the jointing clamp 10, a gap remains. The second webs 8, facing away from each other, locate in the region of the largest cross-sectional extent of the tubular cylindrical section 11. The jointing clamp 10 is pushed into place lengthwise on the joining sections 6, since it is itself not deformable.

The jointing clamp 10 is held in the location as shown, in which it encases the jointing zone with the two joining sections 6 like a shell. In the example embodiment, it is held positioned relative to the preformed bodies 1 and 2 by retainers. However, in principle, the jointing clamp 10 may also be formed with a slight elasticity so that, in the shown starting position of the preformed bodies 1 and 2, it already clamps and locates the two preformed bodies in this starting position, more particularly, by it pressing the webs 7 against each other in the region of the opening 12 of the jointing clamp 10. It would also be possible, if the preformed bodies 1 and 2 and the jointing clamp 10 are correspondingly adapted in shape, to positively retain the jointing clamp 10 in the desired position for the composite, i.e. riding the preformed bodies 1 and 2 or their joining sections 6 prior to foaming. The jointing clamp 10 is, in any case, sufficiently inherently stiff so that it is able to exert the encasing function and the clamping function involved in later foaming of the metal foam material.

After, or also before, locating the jointing clamp 10, supplemental sections 17 of a foamable metal foam material are inserted in a space 9, sheathed by the tubular cylindrical section 11, more particularly, by the skin 14. The supplemental sections 17 serve to set the amount of foam material and the subsequently resulting density of the foam material foamed within the space 9, defined by the tubular cylindrical section 11. The shape of such supplemental sections and the quantity of the foamable metal foam material introduced thereby is selected in accordance with the geometry of the tubular cylindrical section 11 and of the joining sections 6, jutting into the tubular cylindrical section 11, thus making it possible to precisely adapt the metal foam material, present in the space 9, in shape and quantity. Another possibility of adapting to shape and quantity is to machine the metal foam material, for example, from the foamable layer 15 of the jointing clamp 10.

Referring now to FIG. 2a, illustrated is a second embodiment of a jointing clamp 10. In this jointing clamp 10, a sustaining section 13 is located along each side of the opening 12 of the jointing clamp tubular section 11. Such a sustaining section 13 may be formed, for example, by bending it already in the course of forming the tubular cylindrical section 11. By its free longitudinal edge, such a sustaining section 13 is seated on one of the preformed bodies 1 and 2 in the located condition of the jointing clamp 10. In a horizontal orientation, no additional support is needed for this jointing clamp 10. Each of the sustaining sections 13 forms a cross-strutting between each of the preformed bodies 1 and 2 and the joining section 6 protruding upwards from the preformed body. The sustaining sections 13 additionally stiffen the preformed body composite, as a result of which any tendency to deform, for example any tendency to twist, of the individual preformed bodies 1 and 2 may be counteracted. The sustaining effect also remains after the composite has been produced. The sustaining sections 13 are formed from the same slabstock as the tubular cylindrical section 11, but could, of course, also be produced from some other semi-finished product of a compatible material. In the sustaining sections 13 too, an inner foamable layer 15' of a metal foam material is covered by a skin 14' of a solid metal material. Each sustaining section 13 defines by its strut-like arrangement, the inner edge space in the base portion of each joining section 6. Since the foamable material of the layer 15' is present in this inner edge space, this space, too, is foamed in later foaming, meaning that the composite is further stiffened. Apart from the sustaining sections 13 and the advantages involved, the arrangement as shown in FIG. 1b corresponds completely to that as shown in FIG. 1a, so that reference is also made to the comments above as regards the arrangement as shown in FIG. 1b.

Referring now to FIGS. 1b and 2b, each illustrates the compacted composite of the two preformed bodies in accordance with FIGS. 1a and 2a respectively, resulting from having foamed the metal foam material, and of the jointing clamp 10 for the jointing clamp joints as described above. It is clearly evident that the jointing clamp 10, namely the skin 14 thereof, together with the adjoining portions of the preformed bodies 1 and 2, essentially however the jointing clamp 10 alone, form an encasement for the foaming, and in conclusion foamed, metal foam material in the space 9 as well as in the inner edge portion of the joining section 6 of the second preformed body 2, the foamed and re-cooled metal foam material filling out both spaces uniformly.

In principle, it would be sufficient to configure the joining sections 6 as plain upwards protruding webs 7. In this case too, the two preformed bodies 1 and 2 would be firmly pressed against each other by the abutting faces of their joining sections 6 and thus already become joined. In addition, after foaming, a continuous, homogenous cellular metal structure has materialized in the interior of the encasement extending from the metal foam material of the first preformed body 1 via the metal foam material in the tubular cylindrical section 11 of the jointing clamp 10, forming a bridge, to the metal foam material of the second preformed body 2. Boosting the strength of this composite which thus already forms a combined non-positive and material fusion composite, is further enhanced by the forming of the joining sections 6 which, due to their shape, have an anchoring effect. In the matrix of the foamed metal foam material within the tubular section of the jointing clamp 11, the preformed bodies 1 and 2 are anchored in a mushroomed or barbed arrangement due to the configuration of the second webs 8.

FIGS. 3a and 4a illustrate the jointing zone of the two preformed bodies 1 and 2, each of which comprises solid metal skins of differing thickness, sandwiching a layer of foamable metal foam material, like the preformed bodies of the example embodiment as shown in FIGS. 1a and 2a. The jointing clamp 10 of the example embodiments, as shown in FIGS. 3a and 4a, is formed by a tubular cylindrical section 11 in a plain rectangular cross-sectional shape with the full-length opening 12. While the jointing clamp 10 of the example embodiment as shown in FIG. 3a ends in two longitudinal legs 13a, facing each other and forming the longitudinal opening 12 between them, in the case of the jointing clamp 10, as shown in FIG. 4a, the two legs 13a are bent into the inner space 9 of the tubular cylindrical section 11 and extend somewhat further parallel to, and spaced away from, the web 7 of the facing joining section 6. In both example embodiments, the jointing clamp 10 with the two rectangular legs 13a, forming between them the longitudinal opening 12 rests on the preformed bodies 1 and 2. The jointing clamp 10 is firmly pressed against the opposing surfaces of the preformed bodies 1 and 2 by its legs during foaming. It is this pressure in conjunction with the opposing force due to the mushroomed shape of the joining section 6 that additionally stiffens the preformed body composite. As evident from FIG. 4a, due to the additional leg 13b, bent inwards, an even stiffer joint of the preformed bodies by the jointing clamp is possible than in the case of the example embodiment as shown in FIG. 3a.

If necessary, the preformed bodies 1 and 2 are additionally locked in place externally for the jointing procedure.

Referring now to FIGS. 3b and 4b, illustrated are the rectangular jointing clamps 10, as described above, after foaming. In this arrangement, the space 9, surrounded by the jointing clamp 10 and the two preformed bodies 1 and 2, is filled out, homogeneously and completely, with the foamed metal foam, thus resulting in a firm connection of the two preformed bodies 1 and 2 by positive and non-positive action similar to that of the example embodiments as described above.

FIGS. 5a and 5b show an example embodiment of a preformed body composite before and after foaming, in which both the preformed bodies 1 and 2 and the jointing clamp 10 are formed by already foamed metal foam preformed bodies. Here again, sections which have been produced from slabstock are involved. The starting material of the sections 1, 2 and 10 is a triple-laminated slabstock in which the inner foamed cellular metal 4 is sandwiched by a solid metal skin 3 and 5. The preformed bodies 1 and 2 and the jointing clamp 10 experience no further change in volume or shape during foaming for the purpose of joining the preformed bodies 1 and 2. The jointing clamp 10 may also be formed initially as a tubular section, before then being foam ed out fully or partly by means of inserted supplemental sections, instead of it being formed from slabstock having a foamed layer.

Prior to foaming, the preformed bodies 1 and 2 are held in the desired location for the composite purely positively by the jointing clamp 10. The joining sections 6 of this example embodiment are formed by single folding or bending parallel to a longitudinal edge of each of the preformed bodies 1 and 2. The longitudinal edges of the preformed bodies are bent by more than 90° and thus bent back to the corresponding preformed body, resulting in a v-shaped inner edge portion. To adapt to this pair of joining sections, the jointing clamp 10 comprises a tubular cylindrical section 11, as may be obtained from a rectangular slabstock when two opposing longitudinal edges are bent towards each other. In the cross-section, a tubular triangle shaped section materializes, the triangle being cut off or open at one angle to form a longitudinal opening. Once the jointing clamp 10 has been pushed into place over the joining sections 6 of the preformed bodies 1 and 2, this arrangement has the shape of dovetail joint in the jointing zone.

To locate the preformed bodies 1 and 2 even better in the desired position during foaming, at least one spacer 19 is arranged in the space 9 defined by the jointing clamp 10. In the example embodiment, use is made of several triangular spacers 19, plate-shaped corresponding to the shape of the joining sections 6 or of the jointing clamp 10 seated spaced away from each other in the longitudinal direction of the composite, like wedges between the surface areas of the joining sections 6 facing each other. The result is a positive connection held together by the two legs of the jointing clamp 10, opposing and facing each other and totally defined transversely to the longitudinal direction. The material of the spacers 19 is selected so that their melting temperature is sufficiently above the foaming temperature of the metal foam material to be foamed in producing the composite. The spacers 19 may be made, for example, from the same material as the solid metal skins of the preformed bodies 1 and 2 or of the jointing clamp 10. Existing as the foamable metal foam material in the space defined by such an encasement is merely the material of the supplemental sections 17. The spacers may be formed of wire or sheet metal. In the example embodiment sheet metal material is used, for example, structured sheet metal plates as evident from FIGS. 9a to 9c.

Internal thermal treatment of the encased space 9 is achieved by means of a thermal treatment means 18 arranged in the space 9. The thermal treatment means 18 is formed by a full-length flow conduit through which, on the one hand, a heating fluid for this purpose of heating during foaming or, on the other, a coolant fluid for this purpose of cooling at the end of foaming and also thereafter is directed. Should both heating and later cooling be wanted, it may be expedient to provide for this purpose a separate flow conduit like that of the conduit 18.

In addition, the conduit 18, or also a separate conduit of its own, may be used for introducing an inert gas or reaction gas with which the metal foam material is charged during foaming to diminish or enhance the oxidative effects of a foaming gas contained therein. Such an antioxidant or oxidant agent may simultaneously also form a heating and/or coolant fluid. So that the inert gas or reaction gas comes into contact with the metal foam to react therewith, a conduit is provided with small openings, i.e. perforated for this purpose.

By controlling heating and cooling of the inserted foamable supplemental sections 17 via a thermal treatment fluid flowing through the flow or thermal treatment conduit 18 it is reliably assured in particular that the sections 1, 2 and 10 already foamed prior to the jointing procedure are not effected by the jointing foams, e.g. by undesirable initiation of a refoaming of the sections 1, 2 and 10. The conduit 18 may be formed of a tube of any cross-sectional shape, the tube being made of a material having a sufficiently higher melting temperature than the temperature of the thermal treatment fluid required for foaming.

The supplemental sections 17 are provided with a drilled hole, having the same shape and size as that of the tube cross-section. The supplemental sections 17 may thus be skewered onto the conduit 18, alternating with the spacers 19, and introduced into the cavity 9. The spacers 19 are formed to maintain the conduit 18 with the skewered supplemental sections 17 centered in the cavity 9. The spacers 19 form simultaneously, radially protruding cooling fins and/or heating fins of the thermal treatment conduit 18, serving more particularly for heating the supplemental sections 17. After foaming, they are made use of to provide accelerated and defined cooling of the foam phase in the space 9, due to their significantly higher heat conductivity as compared to that of the metal foam. Several thermal treatment conduits 18, at least one conduit for each of the cited purposes or also several for each of the cited purposes, may be disposed in the space 9.

The foamable metal foam material is arranged directly surrounding the conduit 18, thus making it possible to integrate thermal treatment means and metal foam material in a single operation in the jointing zone. In this arrangement, it is also possible to drill commercially available, extruded sections of unfoamed metal foam material for skewering onto the thermal treatment conduit 18. The supplemental sections 17 should be firmly seated on the thermal treatment conduit to ensure a good heat transfer. If spacers 19 are disposed along the thermal treatment conduit 18, each of the individual supplemental sections 17 may be skewered between such spacers 19. A thermal treatment conduit 18 may be formed by a single piece of tube on which the spacers 19 are mounted and thus preferably connected for good heat conductivity. Here, supplemental sections 17 are skewered between each of which spacers 19. However, such a thermal treatment conduit 18 may also be pieced together sectionwise, for example by pressing conduit lengths abutting each other into one socket each.

A thermal treatment conduit or several thermal treatment conduits and spacers, as described above, may also be provided in the cavities of the jointing clamp 10 of the example embodiments as shown in FIGS. 1a to 4b.

Referring now to FIG. 5b, there is illustrated the preformed body composite after foaming. The foamable metal foam material of the supplemental sections 17—or of the several supplemental sections 17 when several such sections 17 are skewered along the thermal treatment conduit 18—then fills out the space 9 and thus produces the non-releasable, high-strength compacted composite between the preformed bodies 1 and 2 and the jointing clamp 10. The forces resulting from foaming are distributed over the contact surface area between the preformed bodies 1 and 2 and the jointing clamp 10, like a wedge force oriented tangentially and normal to the joining sections 6 to thereby press the joining sections 6 against the inner walls of the jointing clamp 10.

Due to the integration of a thermal treatment means, this being conduit 18 in the example embodiment, replacing a damaged preformed body or a damaged portion of a preformed body is possible in a simple way, since with the aid of the conduit 18 only a local heating is achievable in the jointing zone of the replacement preformed body. When, for example, the damaged portion of a preformed body is replaced by a replacement preformed body, the damaged portion of the preformed body is machined out of the composite, the conduit 18 being likewise parted at parting points of the preformed body formed thereby. The conduit lengths in the remaining preformed body composite are then connected to a cooling apparatus. The conduit length in the portion of the machined-out preformed body portion is connected to a heater and use d as the thermal treatment conduit in joint-foaming the replacement preformed body. As an alternative, a new thermal treatment conduit may also be incorporated in the jointing zone for the replacement preformed body. For joint-foaming, a heating fluid is directed from the heater to the thermal treatment conduit for the replacement preformed body and, after having passed through, is returned to the heater. In this way, the thermal treatment conduit for the replacement preformed body forms a connector in the circulation of a heating fluid. To protect against excessive heat input, the remaining thermal treatment conduits 18 of the preformed body portions, adjoining the replacement preformed body, serve as connecting conduits in a cooling circuit so that, during repair work, the temperature of the metal foam material is controlled in the jointing zone of the replacement preformed body and adjoining thereto.

FIGS. 6a and 6b illustrates a preformed body composite, before and after foaming, in which the preformed bodies 1 and 2 themselves form a jointing clamp 10a, i.e. no separate jointing clamp is required. The preformed bodies 1 and 2 are fabricated from foamable slabstock 4, having a bottom and top solid metal skin 3 and 5. The skin 5, to the surface area of which the material of the foamable layer 4 is to expand during foaming, ideally in the direction of the normals of the surface area, is thinner and thus more flexible than the opposing skin 3. The thicker skin 3 is designed sufficiently stable so that the flanged shape of the preformed body edges, i.e. the shape of the joining sections, is retained during foaming. Where necessary, the preformed bodies 1 and 2 are additionally externally fixed to each other during foaming.

The preformed bodies 1 and 2 are shaped at the composite location or in the jointing zone so that between them a positive, non-positive and material fusing connection materializes. In the example embodiment as shown in FIG. 6a, this is assured by the hook-shaped flanging of the preformed bodies 1 and 2. The joining section 6 of the preformed body 1 is bent again into a hook, twice by 90°. The joining section 6 of the second preformed body 2 clasps this hook, it being bent or folded such that a tubular jointing clamp 10a is formed, comprising an opening 12 for introducing the joining section 6 of the preformed body 1. In its jointing zone, and directly adjoining thereto, the second preformed body 2 exhibits the shape of a "question mark". The preformed bodies 1 and 2 can thus be interhooked.

Inserted in the space 9 encased by the preformed bodies 1 and 2 are foamable supplemental sections 17 to ensure that the space 9 is totally foamed out. The supplemental sections 17 are skewered on a thermal treatment conduit 18, and are held in place by spacers 19.

Referring now to FIG. 6b, illustrated is the joint after foaming. During foaming, an expansion in the volume of the preformed bodies 1 and 2 has taken place, preferably perpendicular to the thinner skin 5. As a result of this, the two preformed bodies 1 and 2 are expanded towards each other at a gap 12a, open before foaming, between two facing skins 5, and thus closing this gap 12a. The foamed supplemental section 17 has completely filled out the closed space 9, and pressed the preformed bodies against each other.

FIGS. 6c and 6d illustrate the joint as described with reference to FIGS. 6a and 6b, but with the difference that the skin sheet metal of the preformed bodies 1 and 2, forming the thinner skin 5, is now provided with compression joints 20a and expansion joints 20b to better ensure unobstructed foaming. This may prove necessary, when the thinner skins 5 are not flexible enough to ensure unobstructed foaming, for example, due to their thickness. To configure the compression joints and expansion joints 20a and 20b, the skins 5 are each provided with full-length slots in the fold or bend at the start and end of each radius. The width of the slots is adapted to the anticipated extent and direction of foaming, so that the strips of solid material adjoining joints 20a and 20b are not an obstacle during foaming. It is for this reason that the compression joints 20a are selected wider than the expansion joints 20b, since it is here that the skins 5—as viewed in the direction of the free end of the corresponding preformed body—move in the direction of the start of the radius and thus a larger clearance is of advantage.

Except for the way in which the joints 20a and 20b react, the comments made with reference to FIG. 6b apply as regards FIG. 6d. Due to foaming, the width of the compression joints 20a has become less since the individual sheet metal strips have moved in the direction of the start of the radius. The width of the expansion joints 20b has become greater sinc e the strips of sheet metal have moved outwards to the free ends.

Referring now to FIGS. 7a and 7b, illustrated is a joint of two preformed bodies 1 and 2, including an inserted mounting or load supporting means 20. Just like in the example embodiments described above, each of the preformed bodies 1 and 2 consists of a top and bottom solid metal skin 3 and 5 and a sandwiched foamable layer 4. Similar to the arrangement as shown in FIGS. 1a–4b, a joining section 6 is formed at each of the preformed bodies 1 and 2 to obtain a particularly reliable compacted composite.

The jointing clamp 10 is configured of a solid metal skin 14 and a foamable layer 15, and formed so that the mounting means—this being a sleeve 20 in the example embodiment—may be incorporated transversely to the longitudinal axis of the jointing clamp 10. The sleeve 20 may be configured split, the two halves being screwed or clamped to each other. For this purpose, rivet pins or similar fasteners may be used. If so, care must be taken that the sleeve 20 is made of a material having no negative effects on the jointing clamp 10, e.g. due to contact corrosion with the jointing clamp material. For incorporating the sleeve 20, the jointing clamp 10 is provided full-length with a hole, the shape and size of which corresponds to the outer diameter of the sleeve 20, and runs transversely to the longitudinal axis of the jointing clamp. This hole may be produced by conventional techniques, e.g. by drilling or stamping.

FIG. 7b illustrates the joint after foaming. The cavity 9 is totally filled with foam material, the sleeve 20, additionally included, being totally embedded in foaming and thus firmly locked to the jointing clamp, both positively and non-positively. Another possibility would be to leave an opening free during foaming by means of a pin, made of a material having a higher melting temperature than the temperature needed for foaming, and has the property of not entering into a material fusing connection with the foam material. When foaming has ended completely, the pin is then removed to thus obtain a fastener opening. In this case, the foamable metal foam material would foamingly surround the inserted pin and, after cooling and removal of the pin, leaves an opening, having a closed surface.

The thermal treatment conduit 18 serves to accelerate cooling of the metal foam after foaming, the coolant fluid being guided through the thermal treatment conduit 18. Where necessary, the joint may be additionally cooled from outside by suitable media, e.g. a stream of cold air.

Referring now to FIG. 8, there is illustrated a cross-type composite of four preformed bodies 1 and 2, the joint, as shown in FIGS. 5a and 5b, being incorporated between each two pairs of adjoining preformed bodies 1 and 2. Use is made of the jointing clamp 10, as described with reference to the FIGS. 5a and 5b, in producing each of these joints, reference accordingly being made to the description of this example embodiment in discussing the paired jointing of preformed bodies 1 and 2.

Evident from FIG. 8, are four composite preformed bodies 1, 2, 10 oriented in a common intersection, facing each other perpendicularly in the longitudinal direction of their jointing zones, and located in this relative position as desired for the cross-type composite as shown. A cross-type jointing clamp 10 has the function of a cap clamp. The cap clamp 10 is configured in one piece, with four clamp legs standing perpendicular to each other, protruding from a clamp center portion. The cap clamp may also be composed of several jointing clamps, as shown in FIGS. 5a and 5b, for example, welded to each other. Each of the legs of the cap clamp 10 has, cross-sectionally, the shape of the jointing clamp 10 of the example embodiment of FIGS. 5a and 5b. The cap clamp 10 is three-layer, with solid metal outer skins 14 and 16 sandwiching an inner layer 15 of a foamable metal foam material. The skins 14 and 16 and the sandwiched layer 15 of the cap clamp 10 consist of the same materials as the skins 14 and 16 and the foam material layers 15 of the further jointing clamps 10 for paired joints of preformed bodies 1 and 2.

The cap clamp 10 could also be configured two-layer, comprising only an outer solid metal skin and a foam layer of, the kind used for the jointing clamps of FIGS. 1a to 4b. The foamable metal foam material 15, in this case, of the cap clamp 10 is formed of the same material as the supplemental sections 17, although it would also be possible in configuring the layer 15 as a foamable layer 15 to use a material having a lower foaming temperature, which may be of advantage when the paired joints have already been foamed prior to foaming of the cap clamp 10. Should the layer 15 be a foam layer it is, however, also advantageously possible, due to the thermal treatment conduits 18, to cool the jointing zones of the paired joints up into the zone of the cap clamp 10, when foaming the cap clamp 10, to prevent a repeat foaming. All this requires is connecting the thermal treatment conduits 18 at their open face ends, to a cooling means for passage of a coolant fluid.

FIG. 8 shows the cross-type composite after joint-foaming. Before foaming, the preformed bodies 1 and 2 are placed together, the jointing clamps 10 fitted thereover in the jointing zones and mounted lengthwise, and the thermal treatment conduits 18 inserted with the skewered supplemental sections 17. The supplemental sections 17 are made of the same metal foam material as that of layer 15 of the cap clamp 10. Subsequently, the preformed bodies 1, 2, already clamped as such, are then located in the position shown in FIG. 8, the cap clamp 10 being pressed into place to clasp the four jointing clamps 10. As an alternative to the procedure just described, the four preformed bodies 1, 2 may also be oriented and fixed relative to each other in the position desired for the cross-type composite, and the cap clamp 10 be mounted directly on the preformed bodies 1 and 2. In this type of joint configuration, the jointing clamps 10 for joining two respective preformed bodies 1 and 2 adjoining each other are longitudinally mounted on the joining sections of the preformed bodies 1 and 2 and inserted into the cap clamp 10, it being pushed into the cap clamp 10 as a press-fit, where necessary. Subsequently, the cross-type composite, held together positively, is placed in an oven and heated to the foaming temperature of the metal foam material. By foaming, the secure composite between the individual pairs of preformed bodies 1 and 2, and between the cap clamp 10 and the jointing clamps 10 at the intersection, is produced in a single foaming step.

Should the composite of the preformed bodies 1, 2 exceed the size of the oven or of a conventional oven, the at least one thermal treatment conduit 18 also makes it possible to implement foaming, solely by internal thermal treatment, namely internally heating each of the jointing zones of the preformed bodies 1 and 2 by at least one thermal treatment conduit 18 passing through each of the jointing zones of the adjoining preformed bodies 1 and 2. Should the cap clamp 10 involved be a clamp with foamable metal foam material, one or more thermal treatment conduits may also be arranged in an intermediate zone between the four jointing clamps 10 and the cap clamp 10 seated thereon.

Internal thermal treatment may be the only possibility of heating in foaming the metal foam material in the jointing zone.

Referring now to FIGS. 9a, 9b 9c, there are illustrated structured sheet metal plates 19a, 19b and 19c, from which the spacers 19 as used in the previous example embodiments may be fabricated, for instance by means of a parting technique. The sheet metal plates 19a, 19b and 19c are made of a metal having a melting temperature sufficiently higher than the temperature needed for foaming. For structuring the surface, these sheet metal plates 19a, 19b and 19c are provided as flat semi-finished products with a uniform arrangement of bulges or pockets 21a, 21b and 21c, by means of a suitable tool. Preferably, structuring is done by means of embossing in an embossing mold.

The pockets 21a, 21b and 21c are regular polyeders, cones or truncated cones. Each of the defining side surface areas of the pockets run towards each other at an angle of 120° to the base of each pocket. At their base, the pockets 21a, 21b and 21c are truncated flat, and may be open or closed at the base. It is through such an open base of a pocket that a thermal treatment conduit may be passed through.

The pockets of each of the sheet metal plates 19a, 19b and 19c are arranged densely packed, adjoining each other in rows, each running parallel in two directions perpendicular to each other. In each row, each pocket tapered towards its base in a direction normal to the surface of the sheet metal plate prior to structuring is bordered by pockets, which are tapered to their base in the opposite normal direction, i.e. the pockets alternate as regards their direction of tapering in each row and in the row perpendicular thereto in each case. This is evident from the side view and the cross-sectional views taken along the lines A—A and B—B as shown in each FIG. 9a, 9b and 9c.

The volume of each single pocket amounts to half the size of an expected average foam bubble of the material to be foamed in joint-foaming, volume in this sense being understood as the space enclosed by the defining side surface areas of each pocket and the covering surface areas, joining the edges of the side surface areas imagined flat.

Referring now to FIG. 9d, there is illustrated a spacer 19d, formed from a strip of sheet metal, bent zigzagged, the sheet metal sections of each zigzag being angled 120° to the other. The zigzags form open pockets 21d transversely to the strip of sheet metal. The spacer 19d is bent at one end so that it may be secured to a thermal treatment conduit 18 in a clamp-fit. For this purpose, the start of the sheet metal plate is bent into a circular sleeve 22, having an inner diameter which is slightly less than an outer diameter of the thermal treatment conduit. In order to mount the spacer 19d onto the thermal treatment conduit, the sleeve 22 is flared by a corresponding amount in the elastic portion, and then mounted in the desired position to thus form a clamp-fit on the thermal treatment conduit. The retaining sleeve 22 may also be configured between the ends of the strip of solid metal, especially in the middle, to obtain a spacer equal on two sides.

FIG. 10 represents a cross-sectional view and a longitudinal section view, taken along the line A—A, of a tubular cylindrical section 30, prepared for being foamed out. The tubular cylindrical section 30 is formed by a plain circular tube, having a single-layer tubular shell of a metallic material. To boost its buckling strength and flexural rigidity, the tubular cylindrical section 30 is foamed out with a metal foam material. FIG. 10 shows the tubular cylindrical section 30 immediately prior to being foamed out. For this purpose, a thermal treatment conduit 18, in the form of a tube which is thin compared to the tubular cylindrical section 30, is inserted centrally into the tubular cylindrical section 30. The thermal treatment conduit 18 is held in place concentrically to the tubular cylindrical section 30 by means of spacers 19, protruding radially therefrom, it passing through the tubular cylindrical section 30 in this position.

The spacers 19 are formed by spacer rings arranged along the thermal treatment conduit 18 at regular spaces, and maintain the thermal treatment conduit 18 in position concentric to the tubular cylindrical section 30. Skewered onto the thermal treatment conduit 18 between the spacers 19 are supplemental sections 17 of a foamable metal foam material. The spacers 19 are connected to the thermal treatment conduit 18 for good heat conduction so that they act as thermal treatment surface areas in addition to those of the tubular shell of the thermal treatment conduit 18.

The spacers 19 of FIG. 10 are each formed by two flat, thin, narrow, concentrically annular disks, having radial connecting webs. Instead, structured sheet metal plates fabricated from the spacer sheet metal plates of FIGS. 9a to 9c could be used, through which the flow conduit 18 is centrally guided, and the outer circumferential edge of which is adapted to the internal cross-section of the tubular cylindrical section 30. The sheet metal strips 19d of FIG. 9d could, likewise, be used as spacers 19 by mounting them along the thermal treatment conduit 18 in a number sufficient to position the flow conduit 18 as desired.

At its open face ends, the thermal treatment conduit 18 is connected to a thermal treatment means 18a. The thermal treatment means 18a essentially consists of a heater H and a cooler K, arranged parallel thereto in the thermal treatment circuit, as well as a pump P. The thermal treatment fluid is pumped in the closed thermal treatment circuit by the pump P via a corresponding conduit to the thermal treatment conduit 18, through the thermal treatment conduit 18, and via a corresponding pipe to the heater H or cooler K. By means of valving, circuiting is made optionally via the heater H or the cooler K. In this way, external heating, acting on the tubular cylindrical section 30 during foaming, is supported by an internal heating. For controlled termination of foaming, the thermal treatment means 18a switches over from heating to cooling so that the interior of the tubular cylindrical section 30 at this point in time is actively cooled from within. Due to internal heating during foaming, the thermal energy to be introduced from outside may be reduced as compared to a foamed tubular cylindrical section 30 having no internal heating. It is of advantage, in addition, that it is precisely the foaming zone in the interior of the tubular cylindrical section 30 that is locally heated—which by means of a heat entry from outside has been lastly brought to the temperature needed for foaming, due to the insulating effect of the frothed foam material—that is now directly heated from within. This enables a more homogenous cell structure of the frothed foam material to be achieved in the interior of the tubular cylindrical section 30.

Referring now to FIG. 11, illustrated in cross-section is a horse-shoe shaped tubular section 30a of aluminum for a mast of a sailing boat. The inner space 31, obtained by the horse-shoe shape of the tubular section 30a, serves to accommodate the sail when furled. The tubular section 30a comprises a cavity 9, surrounded on all sides. To stiffen the tubular section 30a, the cavity 9 is foamed out with a metal foam material.

In a portion on one side of the longitudinal centerline C—C, the tubular section 30a is illustrated immediately prior to foaming, and in a portion on the other side of the longitudinal centerline C—C, after foaming.

The tubular section 30a is cold formed into a horse-shoe shape from slabstock, this simultaneously forming also the enclosed cavity 9. The slabstock is a laminated composite material, obtained for example by extrusion, more particularly by means of hydrostatic extrusion, it consisting of a solid metal skin 3 and a layer 4 of a foamable metal foam material metallurgically compatible with the skin material. After the tubular section 3 has been formed, the skin 3 encases the foamable layer 4, which is then on the inside. After forming, the abutting ends of the slabstock may be advantageously firmly joined to each other by means of the joint as described above, although this does not exclude other joints, for example a welded joint.

In the next step, thermal treatment conduits 18, configured as tubes, are inserted in the elongated horse-shoe shaped cavity 9. Several of the spacers 19d, shown in FIG. 9d, are each clamped to the thermal treatment conduits 18. Some of the spacers 19d are provided at both ends with clamping sleeves 22 and clamped simultaneously to adjoining pairs of thermal treatment conduits 18. The result is a continuous thermal treatment assembly which, due to its flexibility, is adaptable to any cavity shape. The spacers 19d maintain the thermal treatment conduits 18 in the desired positions in the cavity 9. The supplemental sections 17, alternating with spacers 19d, are mounted on the thermal treatment conduits 18 in the "skewer" technique as described above in the previous example embodiments.

For foaming, the tubular section 30 is placed into an oven. The thermal treatment conduits 18 serve to pass coolant fluid in order for controlled termination of foaming. In supporting the heat input from outside, heat may also be introduced from within the foam material by means of the conduits 18 to permit a more homogenous foaming, or also merely for an accelerated foaming. Heat input for foaming may also be provided exclusively by means of the thermal treatment conduits, thus, eliminating use of an oven altogether.

The lower part of the cross-section in FIG. 11 illustrates the tubular section 30 after foaming. The cavity 9 is completely and uniformly filled with frothed foam material. It is to be noted that foaming achieves a substantial increase in the strength of the tubular section 30, in particular, its buckling strength and flexural rigidity is substantially enhanced as compared to a non-foamed tubular section of the same material and same weight.

Referring now to FIG. 12, there is illustrated a longitudinal section through a pair of flow conduits consisting of two nested flow conduits 18 and 18a, arranged in a zone including metal foam material 17. The zone including the metal foam material 17 may be the jointing zone within the jointing clamp, as described above in the example embodiments, or it may be some other zone to be foamed, for example, the tubular section of the example embodiment as shown in FIG. 11.

The flow conduit pair is formed by an outer flow conduit 18 and an inner flow conduit 18a located concentrically within the former. The outer flow conduit 18 is in direct contact with the surrounding metal foam material 17. The outer flow conduit 18 is closed off at one end, i.e. it is configured as a blind flow conduit. At its open other end, the outer flow conduit 18 is connected to a thermal treatment system. Protruding through the open end into the outer flow conduit 18 is the inner flow conduit 18a extending almost up to the closed end thereof, an annular gap remaining between the inner flow conduit 18a and the outer flow conduit 18 over the full length with which the inner flow conduit 18a extends into the outer flow conduit 18. To obtain this annular gap, the inner flow conduit 18a is spirally wrapped by a tape 29 of a fiber material, for example a carbon fiber composite. The tape 29 fulfills the two functions of locating the inner flow conduit 18a in the outer flow conduit 18 and of producing a good heat transition from the outer shell surface area of the inner flow conduit 18a to the inner shell surface area of the outer flow conduit 18. For this purpose, fibers of another material are woven into the heat resistant base material of the tape 29 which, in contrast with the base material, have a high thermal conductivity. The base material may be formed, for example, by carbon fibers and the material which, in comparison, has a better thermal conductivity can be a metallic material. A third function is fulfilled by the tape 29 in its being spirally wound on the inner flow conduit 18a. Due to the spiral winding of the tape 29, a spiral or helical return flow conduit for the thermal treatment fluid exists in the annular space between the two flow conduits 18a and 18. The thermal treatment fluid is guided back by the spiral winding of the tape 29 on the inner flow conduit 18a over a flow path, which is thereby elongated and in particular swirled, so that a turbulent return flow occurs with a heat transfer through the annular gap which is enhanced as compared to that of a laminar return flow.

For foaming the metal foam material 17, hot thermal treatment fluid generated by the thermal treatment system is introduced into the inner flow conduit 18a. The thermal treatment fluid introduced passes through the inner flow conduit 18a up to the front end thereof, where it flows around the front edge of the inner flow conduit 18a outwardly and then flows back in the helical return flow conduit through the tape 29 multiply around the inner flow conduit 18 to the thermal treatment system. The return flow of thermal treatment fluid heats the metal foam material 17 up to the foaming temperature, if necessary, slightly above this temperature. Due to the heat exchange in counterflow, a particularly constant temperature is set in the outer flow of thermal treatment fluid. The foaming procedure of the metal foam material 17 is correspondingly uniform.

Internal thermal treatment is used in accordance with the invention not only for heating the metal foam material 17, but also for a controlled conclusion of foaming, as well as preferably also for a controlled cooling of the foamed material. For this purpose, the temperature of the outer flowing thermal treatment fluid is measured upon it leaving the zone with the metal foam material 17. This measurement is preferably effectuated by means of a temperature sensor arranged in the return flow conduit. The sensor may be arranged in the part of the return flow conduit which is located in the foamed zone and thus measure the temperature of the thermal treatment fluid directly in the foamed zone. However, it may also be arranged in a part of the return flow conduit located outside of the foamed zone. If the thermal treatment fluid is guided in a closed circuit such a temperature sensor may also be arranged at any suitable position in the circuit as long as reliable conclusions can be drawn as to the temperature in the foamed zone. However, the thermal treatment fluid must not necessarily be handled in a closed circuit, instead, it may also be generated by the thermal treatment system and then simply given off to the surroundings—cleaned, where necessary—after having passed through the inner flow conduit 18a and the outer flow conduit 18.

The measured temperature is compared to a predetermined maximum temperature. Depending on the result of the comparison, heating is either continued or discontinued. If, for example, the predetermined maximum temperature is attained or achieved over a predetermined period in time, or exceeded, the thermal treatment system changes over from heating to cooling. This may be done in the way described relative to the example embodiment of FIG. 10. Cooling may be discontinued when a predetermined temperature, which may be sensed by the same temperature sensor as before, is attained or exceeded. The temperature sensor may be advantageously worked into the tape 29. In the event that the thermal treatment system comprises an internal combustion engine with a turbocharger for generating the energy, the internal thermal treatment can be effected so that exhaust air of the internal combustion engine is used as the heating fluid and the air supplied to the turbocharger as the cooling fluid. When a change-over is made, exhaust air is replaced by supply air.

What is claimed is:

1. A foamed metal preformed body including foamed metal foam material, wherein at least one outer flow conduit and an inner flow conduit surrounded by said outer flow conduit for communicating a thermal treatment fluid are guided through or into said foamed metal foam material.

2. The foamed metal preformed body as set forth in claim 1, wherein said at least one outer flow conduit is perforated.

3. The foamed metal preformed body as set forth in claim 1 further comprising at least one structured thermal treatment sheeting thermally conductively connected to said at least one outer flow conduit.

4. The foamed metal preformed body as set forth in claim 3, wherein said structured thermal treatment sheeting is formed by a plate of sheet metal having a dense juxtaposed arrangement of pockets.

5. The foamed metal preformed body as set forth in claim 1 further comprising a structural part of a material which, at a foaming temperature of said metal foam material, ensures the dimensional stability of said structural part formed prior to foaming.

6. The foamed metal preformed body as set forth in claim 1, wherein said outer flow conduit is closed off at an end located in said metal foam material, and said inner flow conduit ports into said outer flow conduit upstream of said closed end.

7. The foamed metal preformed body as set forth in claim 1, wherein said inner flow conduit is spirally wrapped with a tape.

8. The foamed metal preformed body as set forth in claim 1, wherein each of said inner and outer flow conduits is made of a heat and pressure resistant composite fiber material worked into which are fibers of another material having a greater thermal conductivity than that of said heat and pressure resistant composite fiber material.

9. A method of fabricating a preformed body comprising the steps of: forming a preformed body defining at least one preformed body zone; foaming in said at least in one preformed body zone a metal foam material after formation of said preformed body; and internally thermally treating said metal foam material during foaming by guiding a thermal treatment fluid in two nested flow conduits in counterflow through or into said metal form material.

10. The method as set forth in claim 9, wherein internally thermally treating further comprises cooling said metal foam material.

11. The method as set forth in claim 9, wherein internally thermally treating further comprises heating said metal foam material.

12. The method as set forth in claim 9 further comprising a supplemental section incorporated in said preformed body zone in which said metal foam material is foamed, said supplemental section comprising foamable metal foam material.

13. The method as set forth in claim 9 further comprising filling at least one flow conduit with a plastics material after foaming of said metal foam material.

14. The method as set forth in claim 9, wherein said two nested conduits comprise an outer flow conduit and an inner flow conduit surrounded by said outer flow conduit, said outer flow conduit is closed off at an end located in said metal foam material, and said inner flow conduit ports into said outer flow conduit upstream of said closed end.

15. A foamed metal preformed body including foamed metal foam material, wherein at least one flow conduit for communicating a thermal treatment fluid is guided through or into said foamed metal foam material and is perforated.

16. A foamed metal preformed body including foamed metal foam material, wherein at least one flow conduit for communicating a thermal treatment fluid is guided through or into said foamed metal foam material, said body further including at least one structured thermal treatment sheeting thermally conductively connected to said at least one flow conduit and formed by a plate of sheet metal having a dense juxtaposed arrangement of pockets.

17. A method of fabricating a preformed body comprising the steps of: forming a preformed body defining at least one preformed body zone; foaming in said at least in one preformed body zone a metal foam material after formation of said preformed body; and internally thermally treating said metal foam material during foaming, including cooling said metal foam material.

18. The method as set forth in claim 17, wherein cooling said metal foam material is done to halt or prevent the foaming of said metal foam material.

19. A method of fabricating a preformed body comprising the steps of: forming a preformed body defining at least one preformed body zone; foaming in said at least in one preformed body zone a metal foam material after formation of said preformed body; internally thermally treating said metal foam material during foaming by guiding a thermal treatment fluid into at least one flow conduit formed in said metal foam material; and filling said at least one flow conduit with a plastics material after foaming of said metal foam material.

* * * * *